US009355382B2

(12) United States Patent
Vance et al.

(10) Patent No.: US 9,355,382 B2
(45) Date of Patent: May 31, 2016

(54) GROUP BASED INFORMATION DISPLAYS

(75) Inventors: Michael Steffen Vance, Kenmore, WA (US); Jared T. Benson, Pleasant Hill, CA (US); Christian Robertson, Concord, CA (US); Shilpa R. Shah, Oakland, CA (US); Gabriel J. White, San Francisco, CA (US)

(73) Assignee: T-Mobile USA, Inc., Bellevue, WA (US)

(*) Notice: Subject to any disclaimer, the term of this patent is extended or adjusted under 35 U.S.C. 154(b) by 526 days.

(21) Appl. No.: 12/412,943

(22) Filed: Mar. 27, 2009

(65) Prior Publication Data

US 2010/0248701 A1 Sep. 30, 2010

(51) Int. Cl.
*H04M 3/493* (2006.01)
*G06Q 10/10* (2012.01)

(52) U.S. Cl.
CPC ..................... *G06Q 10/10* (2013.01)

(58) Field of Classification Search
CPC ...................................... H04W 4/02
See application file for complete search history.

(56) References Cited

U.S. PATENT DOCUMENTS

| | | |
|---|---|---|
| 4,723,209 A | 2/1988 | Hernandez et al. |
| D296,218 S | 6/1988 | Wells-Papanek et al. |
| D298,144 S | 10/1988 | Wells-Papanek et al. |
| 5,590,256 A | 12/1996 | Tchao et al. |
| D384,052 S | 9/1997 | Kodosky |
| D388,424 S | 12/1997 | DeMuro et al. |
| D391,948 S | 3/1998 | Eisenberg |
| 5,724,531 A | 3/1998 | Miyashita et al. |
| 5,751,980 A | 5/1998 | Musashi et al. |
| D395,427 S | 6/1998 | Arora et al. |
| 5,793,365 A | 8/1998 | Tang et al. |
| 5,796,394 A | 8/1998 | Wicks et al. |
| D397,687 S | 9/1998 | Arora et al. |

(Continued)

FOREIGN PATENT DOCUMENTS

| | | |
|---|---|---|
| DE | 10155431 | 6/2003 |
| EP | 0767418 A1 | 4/1997 |

(Continued)

OTHER PUBLICATIONS

Weisser, Cybele and Farnoosh Torabi. "What do you pay to stay connected?" Money Magazine, Nov. 24, 2003. http://money.cnn.com/2003/11/20/pf/portability_strategy_0312/index.htm.

(Continued)

*Primary Examiner* — Justin Lee
(74) *Attorney, Agent, or Firm* — Knobbe, Martens, Olson & Bear, LLP

(57) ABSTRACT

Group-based information displays correspond to the collection of display objects representative of either contacts associated with a user or applications or executable components executable, or otherwise accessible, via the telecommunication device. The group-based information displays can be logically organized according to organizational criteria. The organizational criteria can include, for example, organization or other affiliates criteria, event-based or activity based criteria, topic-based criteria and the like. Through group-based information displays, telecommunication device users can initiate one or more actions corresponding to the selection of display objects. Additionally, as applicable, the user can limit, or otherwise apply, the initiated actions to contacts identified, or otherwise associated, with specific group-based information displays.

34 Claims, 9 Drawing Sheets

(56) References Cited

U.S. PATENT DOCUMENTS

| | | |
|---|---|---|
| D398,595 S | 9/1998 | Baer et al. |
| 5,822,123 A | 10/1998 | Davis et al. |
| 5,867,226 A | 2/1999 | Wehmeyer et al. |
| 5,880,733 A | 3/1999 | Horvitz et al. |
| 5,889,517 A | 3/1999 | Ueda et al. |
| D415,483 S | 10/1999 | Decker |
| 5,987,107 A | 11/1999 | Brown |
| 5,987,469 A | 11/1999 | Lewis et al. |
| 6,006,200 A | 12/1999 | Boies et al. |
| 6,023,275 A | 2/2000 | Horvitz et al. |
| D424,036 S | 5/2000 | Arora et al. |
| D424,541 S | 5/2000 | Mugura |
| 6,104,398 A | 8/2000 | Cox, Jr. et al. |
| 6,130,726 A | 10/2000 | Darbee et al. |
| 6,144,863 A | 11/2000 | Charron |
| 6,151,059 A | 11/2000 | Schein et al. |
| D437,858 S | 2/2001 | Yasui et al. |
| 6,188,406 B1 | 2/2001 | Fong et al. |
| D438,873 S | 3/2001 | Wang et al. |
| 6,201,957 B1 | 3/2001 | Son et al. |
| D440,979 S | 4/2001 | Wang et al. |
| 6,222,921 B1 | 4/2001 | Mugura et al. |
| 6,226,367 B1 | 5/2001 | Smith et al. |
| 6,236,398 B1 | 5/2001 | Kojima et al. |
| 6,249,863 B1 | 6/2001 | Redford et al. |
| D445,426 S | 7/2001 | Wang et al. |
| D446,790 S | 8/2001 | Wang et al. |
| 6,313,877 B1 | 11/2001 | Anderson |
| 6,332,024 B1 | 12/2001 | Inoue et al. |
| D454,138 S | 3/2002 | Imamura et al. |
| D454,139 S | 3/2002 | Feldcamp |
| 6,359,635 B1 | 3/2002 | Perttunen |
| 6,393,430 B1 | 5/2002 | Van Ryzin |
| D459,361 S | 6/2002 | Inagaki |
| D463,444 S | 9/2002 | Istvan et al. |
| 6,460,181 B1 | 10/2002 | Donnelly |
| 6,486,870 B1 | 11/2002 | Kozu |
| D467,252 S | 12/2002 | Lee |
| D469,442 S | 1/2003 | Bohlen, Jr. et al. |
| D470,857 S | 2/2003 | Anderson et al. |
| D471,226 S | 3/2003 | Gray |
| 6,532,459 B1 | 3/2003 | Berson |
| 6,538,635 B1 | 3/2003 | Ringot |
| D472,902 S | 4/2003 | Nashida et al. |
| D473,236 S | 4/2003 | Robbin et al. |
| D474,198 S | 5/2003 | Barnes |
| D474,778 S | 5/2003 | Barnes |
| D475,064 S | 5/2003 | Nashida et al. |
| 6,563,515 B1 | 5/2003 | Reynolds et al. |
| 6,577,330 B1 | 6/2003 | Tsuda et al. |
| 6,600,936 B1 | 7/2003 | Karkkainen et al. |
| D478,912 S | 8/2003 | Johnson |
| D485,279 S | 1/2004 | DeCombe |
| 6,678,891 B1 | 1/2004 | Wilcox et al. |
| D486,499 S | 2/2004 | Hayashi et al. |
| 6,741,268 B1 | 5/2004 | Hayakawa |
| 6,757,365 B1 | 6/2004 | Bogard |
| D495,339 S | 8/2004 | Gildred |
| 6,775,659 B2 | 8/2004 | Clifton-Bligh |
| 6,781,575 B1 | 8/2004 | Hawkins et al. |
| D495,715 S | 9/2004 | Gildred |
| 6,788,987 B2 | 9/2004 | Slechta et al. |
| 6,801,849 B2 | 10/2004 | Szukala et al. |
| 6,845,153 B2 | 1/2005 | Tiburtius et al. |
| 6,850,255 B2 | 2/2005 | Muschetto |
| 6,865,404 B1 | 3/2005 | Tikkala et al. |
| D506,474 S | 6/2005 | Gildred |
| 6,907,575 B2 | 6/2005 | Duarte |
| D507,577 S | 7/2005 | Totten et al. |
| 6,925,650 B1 | 8/2005 | Arsenault et al. |
| D510,581 S | 10/2005 | Robbin et al. |
| 6,959,207 B2 | 10/2005 | Keinonen et al. |
| 6,975,712 B1 | 12/2005 | Schnarel et al. |
| 6,978,473 B1 | 12/2005 | Nsonwu et al. |
| 7,007,239 B1 | 2/2006 | Hawkins et al. |
| 7,036,091 B1 | 4/2006 | Nguyen et al. |
| 7,046,993 B2 * | 5/2006 | Haaramo et al. ......... 455/414.4 |
| D523,439 S | 6/2006 | Kuroda |
| D523,440 S | 6/2006 | Hernandez et al. |
| D523,868 S | 6/2006 | Kuroda |
| 7,083,109 B2 | 8/2006 | Pouchak |
| 7,086,008 B2 | 8/2006 | Capps et al. |
| 7,089,287 B2 | 8/2006 | Bellotti et al. |
| 7,099,862 B2 | 8/2006 | Fitzpatrick et al. |
| D528,556 S | 9/2006 | Decombre |
| 7,111,788 B2 | 9/2006 | Reponen |
| 7,117,445 B2 | 10/2006 | Berger |
| 7,137,073 B2 | 11/2006 | Kim et al. |
| 7,174,516 B2 | 2/2007 | Chipchase |
| 7,178,109 B2 | 2/2007 | Hewson et al. |
| 7,187,761 B2 | 3/2007 | Bookstaff |
| D540,340 S | 4/2007 | Cummins |
| D543,986 S | 6/2007 | Rimas-Ribikauskas et al. |
| D543,987 S | 6/2007 | Rimas-Ribikauskas et al. |
| D543,992 S | 6/2007 | Vigesaa |
| D544,875 S | 6/2007 | Wang et al. |
| D544,877 S | 6/2007 | Sasser |
| D545,324 S | 6/2007 | Decombe |
| 7,231,229 B1 | 6/2007 | Hawkins et al. |
| 7,236,576 B2 | 6/2007 | Schnarel et al. |
| 7,236,780 B2 | 6/2007 | Benco et al. |
| D545,827 S | 7/2007 | Evans et al. |
| D545,832 S | 7/2007 | Armendariz |
| D546,342 S | 7/2007 | Armendariz |
| D547,321 S | 7/2007 | Viegers et al. |
| 7,248,677 B2 | 7/2007 | Randall et al. |
| 7,248,857 B1 | 7/2007 | Richardson et al. |
| D548,239 S | 8/2007 | Rimas-Ribikauskas et al. |
| D548,743 S | 8/2007 | Takahashi et al. |
| D550,681 S | 9/2007 | Totten et al. |
| D551,252 S | 9/2007 | Andre et al. |
| D552,114 S | 10/2007 | Tolle et al. |
| D554,142 S | 10/2007 | Cameron |
| 7,280,652 B2 | 10/2007 | Bocking et al. |
| D554,652 S | 11/2007 | Shen et al. |
| D556,765 S | 12/2007 | Evans et al. |
| D557,268 S | 12/2007 | Fletcher |
| D558,221 S | 12/2007 | Nagata et al. |
| D562,343 S | 2/2008 | Fletcher |
| 7,330,845 B2 | 2/2008 | Lee et al. |
| D563,972 S | 3/2008 | Sherry |
| 7,343,565 B2 | 3/2008 | Ying et al. |
| D565,586 S | 4/2008 | Shin et al. |
| D565,627 S | 4/2008 | Kase |
| D567,251 S | 4/2008 | Sadler |
| D567,817 S | 4/2008 | Kwag et al. |
| 7,353,034 B2 | 4/2008 | Haney |
| 7,360,174 B2 | 4/2008 | Grossman et al. |
| D568,334 S | 5/2008 | Okaro et al. |
| D568,897 S | 5/2008 | Byeon |
| D568,898 S | 5/2008 | Byeon |
| D568,899 S | 5/2008 | Byeon |
| D569,387 S | 5/2008 | Byeon |
| 7,369,850 B2 | 5/2008 | Andrew et al. |
| D570,369 S | 6/2008 | Fletcher |
| D571,819 S | 6/2008 | Scott et al. |
| D573,601 S | 7/2008 | Gregov et al. |
| D574,392 S | 8/2008 | Kwag et al. |
| D575,297 S | 8/2008 | Glezer et al. |
| D575,298 S | 8/2008 | Chen et al. |
| D575,792 S | 8/2008 | Benson |
| D576,174 S | 9/2008 | Ording et al. |
| D577,364 S | 9/2008 | Flynt et al. |
| D578,134 S | 10/2008 | Jasinski |
| D578,543 S | 10/2008 | Ulm et al. |
| 7,437,005 B2 | 10/2008 | Drucker et al. |
| D580,450 S | 11/2008 | Chen et al. |
| D580,946 S | 11/2008 | Chen et al. |
| 7,450,927 B1 | 11/2008 | Creswell et al. |
| D582,426 S | 12/2008 | Chen et al. |
| D582,928 S | 12/2008 | Blankenship et al. |
| D583,823 S | 12/2008 | Chen et al. |
| D584,737 S | 1/2009 | Stone et al. |
| D585,453 S | 1/2009 | Chen et al. |

(56) References Cited

U.S. PATENT DOCUMENTS

| | | |
|---|---|---|
| D585,454 S | 1/2009 | Ismail |
| D586,361 S | 2/2009 | Horowitz et al. |
| D586,362 S | 2/2009 | Horowitz et al. |
| 7,490,295 B2 | 2/2009 | Chaudhri et al. |
| D588,148 S | 3/2009 | Stone et al. |
| D588,149 S | 3/2009 | Brownell et al. |
| D588,150 S | 3/2009 | Stone et al. |
| 7,503,014 B2 | 3/2009 | Tojo et al. |
| D589,970 S | 4/2009 | Bhat et al. |
| D590,407 S | 4/2009 | Watanabe et al. |
| D590,412 S | 4/2009 | Saft et al. |
| 7,519,912 B2 | 4/2009 | Moody et al. |
| 7,526,306 B2 | 4/2009 | Brems et al. |
| D592,218 S | 5/2009 | Blankenship et al. |
| D592,674 S | 5/2009 | Kwag |
| D593,120 S | 5/2009 | Bouchard et al. |
| 7,536,654 B2 | 5/2009 | Anthony et al. |
| D593,574 S | 6/2009 | Guimaraes et al. |
| D593,576 S | 6/2009 | Ball et al. |
| D594,015 S | 6/2009 | Singh et al. |
| D594,465 S | 6/2009 | Hong et al. |
| D594,872 S | 6/2009 | Akimoto |
| 7,543,245 B2 | 6/2009 | Irimajiri |
| 7,546,543 B2 | 6/2009 | Louch et al. |
| 7,555,727 B2 | 6/2009 | Hawkins et al. |
| D596,192 S | 7/2009 | Shotel |
| 7,562,304 B2 | 7/2009 | Dixon et al. |
| 7,577,700 B2 | 8/2009 | Tolson et al. |
| 7,580,363 B2 | 8/2009 | Sorvari et al. |
| D599,368 S | 9/2009 | Kanga et al. |
| D599,806 S | 9/2009 | Brown et al. |
| D599,807 S | 9/2009 | Marashi |
| D599,810 S | 9/2009 | Scalisi et al. |
| D599,811 S | 9/2009 | Watanabe et al. |
| D599,812 S | 9/2009 | Hirsch |
| D599,813 S | 9/2009 | Hirsch |
| D599,814 S | 9/2009 | Ogura et al. |
| D601,153 S | 9/2009 | Setiawan et al. |
| 7,587,215 B2 | 9/2009 | Chakraborty et al. |
| 7,587,683 B2 | 9/2009 | Ito et al. |
| D602,038 S | 10/2009 | Channell et al. |
| 7,603,628 B2 | 10/2009 | Park et al. |
| D603,415 S | 11/2009 | Lin et al. |
| D603,416 S | 11/2009 | Poling et al. |
| D603,418 S | 11/2009 | Magnani et al. |
| D603,420 S | 11/2009 | Channell |
| D603,867 S | 11/2009 | La et al. |
| D604,310 S | 11/2009 | Ahn |
| D604,316 S | 11/2009 | Hoefnagels et al. |
| D604,317 S | 11/2009 | Hoefnagels et al. |
| D604,740 S | 11/2009 | Matheny et al. |
| 7,620,996 B2 | 11/2009 | Torres et al. |
| D605,200 S | 12/2009 | Sakai |
| D605,652 S | 12/2009 | Plaisted et al. |
| D605,653 S | 12/2009 | Danton |
| D606,088 S | 12/2009 | Yokouchi et al. |
| D606,550 S | 12/2009 | La et al. |
| D607,002 S | 12/2009 | Jonasson et al. |
| 7,636,889 B2 | 12/2009 | Weber et al. |
| D608,364 S | 1/2010 | Walsh et al. |
| D608,366 S | 1/2010 | Matas |
| D608,367 S | 1/2010 | Scalisi et al. |
| D608,368 S | 1/2010 | Bamford |
| 7,644,144 B1 * | 1/2010 | Horvitz et al. ............... 709/223 |
| 7,646,745 B2 | 1/2010 | Caldwell et al. |
| 7,650,361 B1 | 1/2010 | Wong et al. |
| D609,714 S | 2/2010 | Oda et al. |
| D609,715 S | 2/2010 | Chaudhri |
| D610,159 S | 2/2010 | Matheny et al. |
| D610,161 S | 2/2010 | Matas |
| 7,665,028 B2 | 2/2010 | Cummins et al. |
| 7,665,033 B2 | 2/2010 | Byrne et al. |
| D611,056 S | 3/2010 | Langlois et al. |
| D611,484 S | 3/2010 | Mays et al. |
| D611,485 S | 3/2010 | Marashi |
| D611,489 S | 3/2010 | Bell et al. |
| D611,490 S | 3/2010 | Lee et al. |
| D612,394 S | 3/2010 | La et al. |
| D612,860 S | 3/2010 | Tarara et al. |
| 7,673,017 B2 | 3/2010 | Kim et al. |
| 7,685,520 B2 | 3/2010 | Rashkovskiy et al. |
| 7,685,530 B2 | 3/2010 | Sherrard et al. |
| D613,300 S | 4/2010 | Chaudhri |
| D613,747 S | 4/2010 | Jonasson et al. |
| D614,191 S | 4/2010 | Takano et al. |
| D614,192 S | 4/2010 | Takano et al. |
| D614,633 S | 4/2010 | Watanabe et al. |
| D614,643 S | 4/2010 | Viegers et al. |
| D614,646 S | 4/2010 | Chen et al. |
| 7,702,543 B2 | 4/2010 | MacKay et al. |
| 7,703,031 B2 | 4/2010 | Nakagawa et al. |
| 7,705,833 B2 | 4/2010 | Kim |
| D615,090 S | 5/2010 | Sogabe |
| D615,546 S | 5/2010 | Lundy et al. |
| D615,549 S | 5/2010 | Caine et al. |
| 7,720,498 B2 | 5/2010 | Lee |
| D617,804 S | 6/2010 | Hirsch |
| D617,805 S | 6/2010 | Scalisi et al. |
| D618,250 S | 6/2010 | Stallings et al. |
| 7,735,021 B2 | 6/2010 | Padawer et al. |
| 7,738,912 B1 | 6/2010 | Hawkins et al. |
| D619,593 S | 7/2010 | Fujioka et al. |
| D619,594 S | 7/2010 | Jonasson et al. |
| D620,948 S | 8/2010 | Scalisi et al. |
| D621,844 S | 8/2010 | Van Os |
| D621,845 S | 8/2010 | Anzures et al. |
| D622,280 S | 8/2010 | Tarara |
| 7,779,358 B1 | 8/2010 | Gupta et al. |
| D624,556 S | 9/2010 | Chaudhri |
| 7,797,641 B2 | 9/2010 | Karukka et al. |
| D625,325 S | 10/2010 | Vu et al. |
| D626,136 S | 10/2010 | Fujimura |
| D627,790 S | 11/2010 | Chaudhri |
| D628,206 S | 11/2010 | Lemay |
| 7,831,675 B2 | 11/2010 | Narayanaswami et al. |
| 7,835,736 B2 * | 11/2010 | Larocca .................. 455/432.3 |
| 7,865,178 B2 * | 1/2011 | Haaramo et al. ........... 455/414.1 |
| 7,898,600 B2 | 3/2011 | Lee et al. |
| D638,025 S | 5/2011 | Saft et al. |
| 7,971,222 B2 | 6/2011 | Ellis |
| 8,015,187 B2 | 9/2011 | Choi et al. |
| 8,032,470 B1 | 10/2011 | Heidenreich et al. |
| 8,046,801 B2 | 10/2011 | Ellis et al. |
| D652,843 S | 1/2012 | van Os |
| 8,631,351 B2 | 1/2014 | Fong et al. |
| 2001/0044743 A1 | 11/2001 | McKinley et al. |
| 2001/0046886 A1 | 11/2001 | Ishigaki |
| 2002/0045960 A1 | 4/2002 | Phillips et al. |
| 2002/0052754 A1 | 5/2002 | Joyce et al. |
| 2002/0054164 A1 | 5/2002 | Uemura |
| 2002/0059201 A1 | 5/2002 | Work |
| 2002/0145623 A1 | 10/2002 | DeCombe |
| 2003/0014179 A1 | 1/2003 | Szukala et al. |
| 2003/0078033 A1 | 4/2003 | Sauer et al. |
| 2003/0164818 A1 | 9/2003 | Miller-Smith et al. |
| 2003/0210265 A1 | 11/2003 | Haimberg |
| 2003/0224816 A1 | 12/2003 | Kundaje et al. |
| 2004/0017376 A1 | 1/2004 | Tagliabue et al. |
| 2004/0041836 A1 | 3/2004 | Zaner et al. |
| 2004/0046796 A1 | 3/2004 | Fujita |
| 2004/0067751 A1 | 4/2004 | Vandermeijden et al. |
| 2004/0075691 A1 | 4/2004 | Moon |
| 2004/0077340 A1 | 4/2004 | Forsyth |
| 2004/0091093 A1 | 5/2004 | Bookstaff |
| 2004/0100479 A1 | 5/2004 | Nakano et al. |
| 2004/0102225 A1 | 5/2004 | Furuta et al. |
| 2004/0119758 A1 | 6/2004 | Grossman et al. |
| 2004/0122683 A1 | 6/2004 | Grossman et al. |
| 2004/0122684 A1 | 6/2004 | Kaikuranta |
| 2004/0133638 A1 | 7/2004 | Doss et al. |
| 2004/0155908 A1 | 8/2004 | Wagner |
| 2004/0162812 A1 | 8/2004 | Lane |
| 2004/0172455 A1 | 9/2004 | Green et al. |
| 2004/0185890 A1 | 9/2004 | Drozt et al. |

(56) References Cited

U.S. PATENT DOCUMENTS

| | | |
|---|---|---|
| 2004/0221239 A1 | 11/2004 | Hachigian et al. |
| 2004/0235520 A1 | 11/2004 | Cadiz et al. |
| 2004/0236749 A1 | 11/2004 | Cortright et al. |
| 2004/0237048 A1 | 11/2004 | Tojo et al. |
| 2004/0239982 A1 | 12/2004 | Gignac |
| 2004/0250217 A1 | 12/2004 | Tojo et al. |
| 2004/0268228 A1 | 12/2004 | Croney et al. |
| 2004/0268265 A1 | 12/2004 | Berger |
| 2005/0005235 A1 | 1/2005 | Satterfield et al. |
| 2005/0010876 A1 | 1/2005 | Robertson et al. |
| 2005/0020243 A1 | 1/2005 | Benco et al. |
| 2005/0033603 A1 | 2/2005 | Suzuki et al. |
| 2005/0033698 A1 | 2/2005 | Chapman |
| 2005/0039140 A1 | 2/2005 | Chen |
| 2005/0041011 A1 | 2/2005 | Silfverberg et al. |
| 2005/0071780 A1 | 3/2005 | Muller et al. |
| 2005/0079863 A1 | 4/2005 | Macaluso |
| 2005/0086611 A1 | 4/2005 | Takabe et al. |
| 2005/0091272 A1 | 4/2005 | Smith et al. |
| 2005/0094205 A1 | 5/2005 | Lo et al. |
| 2005/0114374 A1 | 5/2005 | Juszkiewicz et al. |
| 2005/0118996 A1 | 6/2005 | Lee et al. |
| 2005/0120306 A1 | 6/2005 | Klassen et al. |
| 2005/0138574 A1 | 6/2005 | Lin |
| 2005/0143135 A1 | 6/2005 | Brems et al. |
| 2005/0143138 A1 | 6/2005 | Lee et al. |
| 2005/0160376 A1 | 7/2005 | Sciammarella et al. |
| 2005/0163290 A1 | 7/2005 | Gilles et al. |
| 2005/0172001 A1* | 8/2005 | Zaner et al. ............ 709/205 |
| 2005/0182837 A1* | 8/2005 | Harris et al. ............ 709/226 |
| 2005/0209994 A1 | 9/2005 | Noro et al. |
| 2005/0210104 A1* | 9/2005 | Torvinen ............ 709/205 |
| 2005/0229110 A1 | 10/2005 | Gegner et al. |
| 2005/0235225 A1 | 10/2005 | Pradhan et al. |
| 2005/0235226 A1 | 10/2005 | Watanabe et al. |
| 2005/0235251 A1 | 10/2005 | Arend et al. |
| 2005/0243979 A1 | 11/2005 | Starbuck et al. |
| 2005/0245236 A1 | 11/2005 | Servi et al. |
| 2005/0246654 A1 | 11/2005 | Hally et al. |
| 2005/0261011 A1 | 11/2005 | Scott |
| 2005/0261032 A1 | 11/2005 | Seo et al. |
| 2005/0278652 A1 | 12/2005 | Scholz |
| 2006/0009249 A1 | 1/2006 | Fu et al. |
| 2006/0010395 A1 | 1/2006 | Aaltonen |
| 2006/0030347 A1 | 2/2006 | Biswaas |
| 2006/0048076 A1 | 3/2006 | Vronay et al. |
| 2006/0053379 A1 | 3/2006 | Henderson et al. |
| 2006/0055700 A1 | 3/2006 | Niles et al. |
| 2006/0084410 A1 | 4/2006 | Sutaria et al. |
| 2006/0101350 A1 | 5/2006 | Scott |
| 2006/0112354 A1 | 5/2006 | Park et al. |
| 2006/0123360 A1 | 6/2006 | Anwar et al. |
| 2006/0140015 A1 | 6/2006 | Kasamsetty |
| 2006/0141996 A1 | 6/2006 | Huh |
| 2006/0143574 A1 | 6/2006 | Ito et al. |
| 2006/0146765 A1 | 7/2006 | Van De Sluis et al. |
| 2006/0148499 A1 | 7/2006 | Chie |
| 2006/0148522 A1 | 7/2006 | Chipchase et al. |
| 2006/0168539 A1 | 7/2006 | Hawkins et al. |
| 2006/0173963 A1* | 8/2006 | Roseway et al. ............ 709/206 |
| 2006/0174121 A1 | 8/2006 | Omae et al. |
| 2006/0212829 A1 | 9/2006 | Yahiro et al. |
| 2006/0223518 A1 | 10/2006 | Haney |
| 2006/0224675 A1 | 10/2006 | Fox et al. |
| 2006/0242234 A1* | 10/2006 | Counts et al. ............ 709/204 |
| 2006/0242581 A1 | 10/2006 | Manion et al. |
| 2006/0242597 A1 | 10/2006 | Park |
| 2006/0253787 A1 | 11/2006 | Fogg |
| 2006/0277488 A1 | 12/2006 | Cok et al. |
| 2006/0293057 A1 | 12/2006 | Mazerski et al. |
| 2007/0011617 A1 | 1/2007 | Akagawa et al. |
| 2007/0026645 A1 | 2/2007 | Lieber et al. |
| 2007/0027920 A1 | 2/2007 | Alvarado et al. |
| 2007/0032267 A1 | 2/2007 | Haitani et al. |
| 2007/0033540 A1 | 2/2007 | Bridges et al. |
| 2007/0035513 A1* | 2/2007 | Sherrard et al. ............ 345/157 |
| 2007/0043688 A1 | 2/2007 | Kountz et al. |
| 2007/0060206 A1 | 3/2007 | Dam Nielsen et al. |
| 2007/0067738 A1* | 3/2007 | Flynt et al. ............ 715/810 |
| 2007/0072586 A1 | 3/2007 | Morhenn et al. |
| 2007/0073874 A1 | 3/2007 | Moghaddam et al. |
| 2007/0079246 A1 | 4/2007 | Morillon et al. |
| 2007/0118813 A1 | 5/2007 | Forstall et al. |
| 2007/0129112 A1 | 6/2007 | Tarn |
| 2007/0135103 A1 | 6/2007 | Middleton |
| 2007/0136687 A1 | 6/2007 | Pak |
| 2007/0162862 A1* | 7/2007 | Ogasawara et al. ............ 715/751 |
| 2007/0168262 A1 | 7/2007 | Morotomi et al. |
| 2007/0174389 A1 | 7/2007 | Armstrong et al. |
| 2007/0198947 A1 | 8/2007 | Cox et al. |
| 2007/0226645 A1 | 9/2007 | Kongqiao et al. |
| 2007/0250936 A1 | 10/2007 | Nakamura et al. |
| 2007/0268908 A1 | 11/2007 | Linkola et al. |
| 2007/0271528 A1 | 11/2007 | Park et al. |
| 2008/0022228 A1 | 1/2008 | Kwon et al. |
| 2008/0034317 A1 | 2/2008 | Fard et al. |
| 2008/0059570 A1 | 3/2008 | Bill |
| 2008/0081653 A1 | 4/2008 | Mock et al. |
| 2008/0086531 A1* | 4/2008 | Chavda et al. ............ 709/206 |
| 2008/0086703 A1 | 4/2008 | Flynt et al. |
| 2008/0098311 A1 | 4/2008 | Delarue et al. |
| 2008/0111826 A1 | 5/2008 | Endrikhovski et al. |
| 2008/0122870 A1 | 5/2008 | Brodersen et al. |
| 2008/0158189 A1 | 7/2008 | Kim |
| 2008/0172030 A1 | 7/2008 | Blomquist |
| 2008/0189614 A1 | 8/2008 | Jeong et al. |
| 2008/0189627 A1 | 8/2008 | Nikitin et al. |
| 2008/0194934 A1 | 8/2008 | Ray et al. |
| 2008/0215978 A1 | 9/2008 | Bamba |
| 2008/0220751 A1 | 9/2008 | De Bast |
| 2008/0220752 A1 | 9/2008 | Forstall et al. |
| 2008/0235248 A1 | 9/2008 | Krantz et al. |
| 2008/0256170 A1 | 10/2008 | Hayashi et al. |
| 2008/0261569 A1 | 10/2008 | Britt et al. |
| 2008/0263069 A1 | 10/2008 | Harris et al. |
| 2008/0280600 A1 | 11/2008 | Zhou |
| 2008/0282158 A1 | 11/2008 | Aaltonen et al. |
| 2008/0288612 A1 | 11/2008 | Kwon |
| 2008/0288880 A1 | 11/2008 | Reponen et al. |
| 2008/0319782 A1* | 12/2008 | Good ............ 705/1 |
| 2009/0040875 A1 | 2/2009 | Buzescu et al. |
| 2009/0043847 A1 | 2/2009 | Laurila |
| 2009/0077496 A1 | 3/2009 | Aravamudan et al. |
| 2009/0164923 A1 | 6/2009 | Ovi |
| 2009/0187630 A1 | 7/2009 | Narayanaswami et al. |
| 2009/0199120 A1 | 8/2009 | Baxter et al. |
| 2009/0228513 A1 | 9/2009 | Tian |
| 2009/0300518 A1 | 12/2009 | Mock et al. |
| 2009/0303188 A1 | 12/2009 | Triplett |
| 2010/0004008 A1 | 1/2010 | Abolrous et al. |
| 2010/0020727 A1 | 1/2010 | Narayan et al. |
| 2010/0020953 A1 | 1/2010 | Lidstrom et al. |
| 2010/0050123 A1 | 2/2010 | Sherrard et al. |
| 2010/0062753 A1 | 3/2010 | Wen et al. |
| 2010/0064231 A1 | 3/2010 | Gupta |
| 2010/0094837 A1 | 4/2010 | O'Sullivan et al. |
| 2010/0095009 A1* | 4/2010 | Matuszewski et al. ............ 709/228 |
| 2010/0144331 A1 | 6/2010 | Koberg et al. |
| 2010/0180001 A1 | 7/2010 | Hardt |
| 2010/0190467 A1 | 7/2010 | Scott et al. |
| 2010/0190468 A1 | 7/2010 | Scott et al. |
| 2010/0241544 A1 | 9/2010 | Benson et al. |
| 2010/0245262 A1 | 9/2010 | Vance et al. |
| 2010/0250606 A1 | 9/2010 | Vance et al. |
| 2010/0287504 A1 | 11/2010 | Vance et al. |
| 2010/0333029 A1 | 12/2010 | Smith et al. |
| 2011/0258547 A1 | 10/2011 | Symons et al. |
| 2012/0071244 A1 | 3/2012 | Gillo et al. |
| 2013/0019173 A1 | 1/2013 | Kotler et al. |
| 2013/0019203 A1 | 1/2013 | Kotler et al. |
| 2013/0024780 A1 | 1/2013 | Sutedja et al. |
| 2013/0275897 A1 | 10/2013 | Vance et al. |
| 2013/0281161 A1 | 10/2013 | Vance et al. |
| 2013/0283180 A1 | 10/2013 | Vance et al. |

(56) References Cited

U.S. PATENT DOCUMENTS

| | | |
|---|---|---|
| 2014/0033071 A1 | 1/2014 | Gruber et al. |
| 2014/0220942 A1 | 8/2014 | Vance et al. |
| 2015/0072644 A1 | 3/2015 | Sherrard et al. |

FOREIGN PATENT DOCUMENTS

| | | |
|---|---|---|
| EP | 1246434 | 10/2002 |
| EP | 1469374 A1 | 10/2004 |
| EP | 1482758 A1 | 12/2004 |
| EP | 1571808 | 9/2005 |
| EP | 1608190 A1 | 12/2005 |
| JP | 07-129363 | 5/1995 |
| JP | 08-123658 | 5/1996 |
| JP | 09-083630 | 3/1997 |
| JP | 09-311661 | 12/1997 |
| JP | H11-088496 | 3/1999 |
| JP | H11-327741 | 11/1999 |
| JP | 2000-259304 | 9/2000 |
| JP | 2000-348058 A | 12/2000 |
| JP | 2002-009899 A | 1/2002 |
| JP | 2003-198705 | 7/2003 |
| JP | 2004-208217 A | 7/2004 |
| JP | 2004-348601 A | 12/2004 |
| JP | 2005-072958 A | 3/2005 |
| JP | 3834039 B2 | 10/2006 |
| KR | 10-2002-0069964 A | 9/2002 |
| KR | 10-2004-0024967 A | 3/2004 |
| KR | 10-2005-0043148 A | 5/2005 |
| KR | 10-2006-0042808 A | 5/2005 |
| KR | 10-2007-0029009 A | 3/2007 |
| KR | 10-2008-0004127 A | 1/2008 |
| KR | 10-2008-0019614 A | 3/2008 |
| KR | 10-2008-0079716 A | 9/2008 |
| WO | WO 00/25501 | 5/2000 |
| WO | WO 03/044756 A1 | 5/2003 |
| WO | WO 03/062976 A1 | 7/2003 |
| WO | WO 2005/045799 A1 | 5/2005 |
| WO | WO 2005/064441 A1 | 7/2005 |
| WO | WO 2005/120112 A1 | 12/2005 |
| WO | WO 2006/016227 A2 | 2/2006 |
| WO | WO 2006/067567 A1 | 6/2006 |
| WO | WO 2007/093997 A1 | 8/2007 |
| WO | WO 2007/143678 A2 | 12/2007 |
| WO | WO 2008/030776 A2 | 3/2008 |
| WO | WO 2010/111610 A2 | 9/2010 |
| WO | WO 2010/111614 A2 | 9/2010 |
| WO | WO 2010/111637 A2 | 9/2010 |
| WO | WO 2010/111642 A2 | 9/2010 |
| WO | WO 2010/111643 A2 | 9/2010 |
| WO | WO 2010/111670 A2 | 9/2010 |
| WO | WO 2010/111675 A2 | 9/2010 |
| WO | WO 2010/111679 A2 | 9/2010 |

OTHER PUBLICATIONS

AT&T, *LG Xenon User Guide*, Apr. 8, 2009, pp. 1-146.

Boy Genius. "LG Xenon hitting AT&T before Christmas?" Boy Genius Report, Sep. 24, 2008. http://www.boygeniusreport.com/2008/09/24/lg-xenon-hitting-att-before-christmas/.

Alltel Launches 'My Circle,' a One-of-a-Kind Program That Gives Customers Free Calls to Any Network or Number They Choose, Business Wire, Apr. 20, 2006, pp. 1, New York.

Alltel's 'My Circle' Plan Lets Subscribers Adds 10 Numbers for Unlimited Calls, Wireless News, Apr. 23, 2006, pp. 2, Coventry.

Cuneo, Alice Z., Alltel Gets Aggressive in Telecom War, Advertising Age, Apr. 24, 2006, vol. 77, Issue 17, pp. 8, 1 pg., Chicago (Midwest region edition).

"Alltel Corp at Lehman Brothers Worldwide Wireless, Wirelein, and Media Conference". Fair Disclosure Wire. May 22, 2006.

"Alltel's free wireless calling plan paying off", Virgil Larson, Knight Rider Tribune Business News, May 2005, 2 pages.

Belson, K., "Alltel to Offer Free-Calling Plan, With Limits," New York Times, New York, Apr. 21, 2006, p. C9.

MobileCom Provides All Residential Pay as You Go Subscribers the Ability to Talk for 1 Piaster Per Minute Day and Night, www.albawaba.com, Mar. 14, 2006.

Sellers, P., MCI Communications Yes, Brands Can Still Work Magic, www.money.cnn.com, Feb. 7, 1994.

* cited by examiner

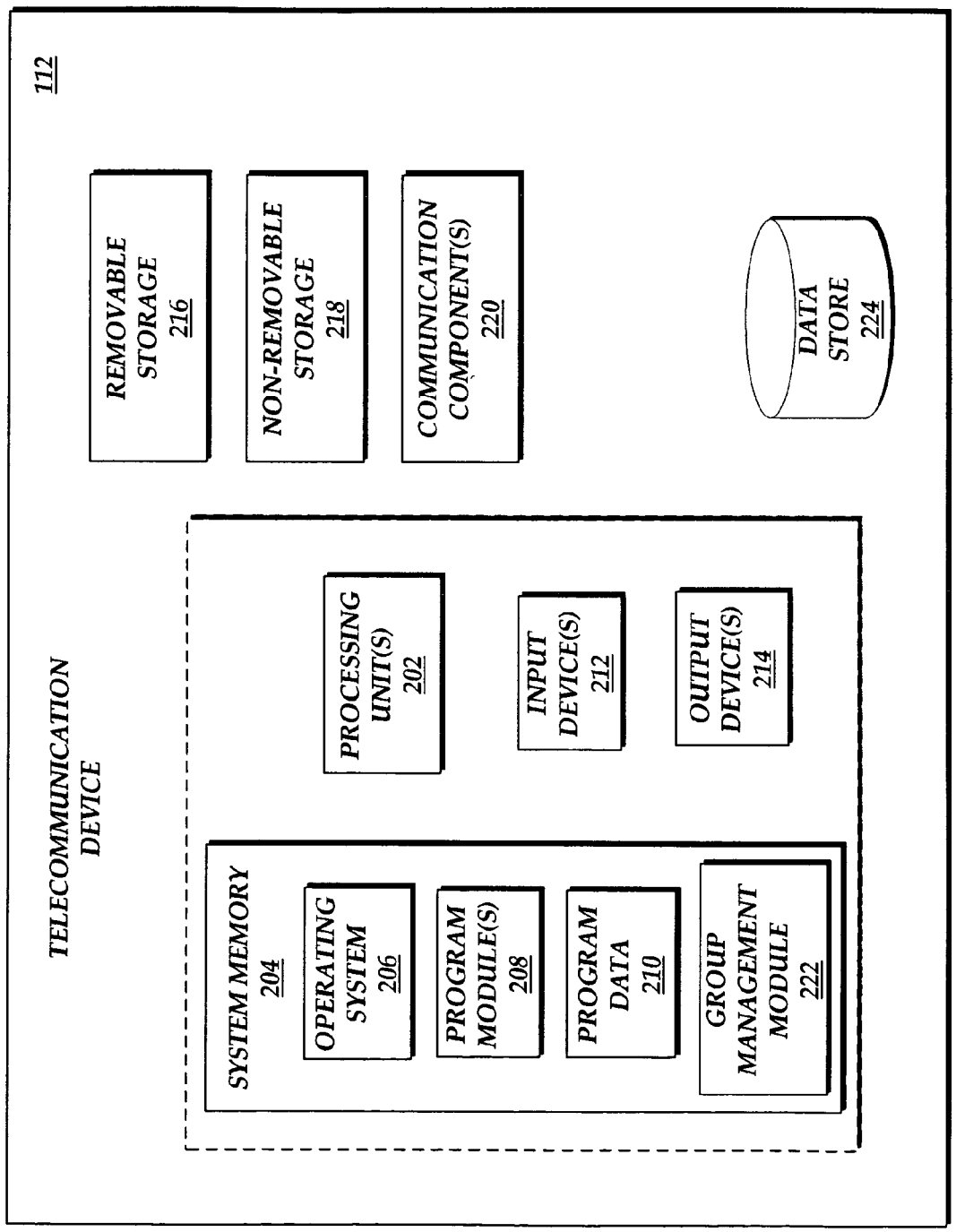

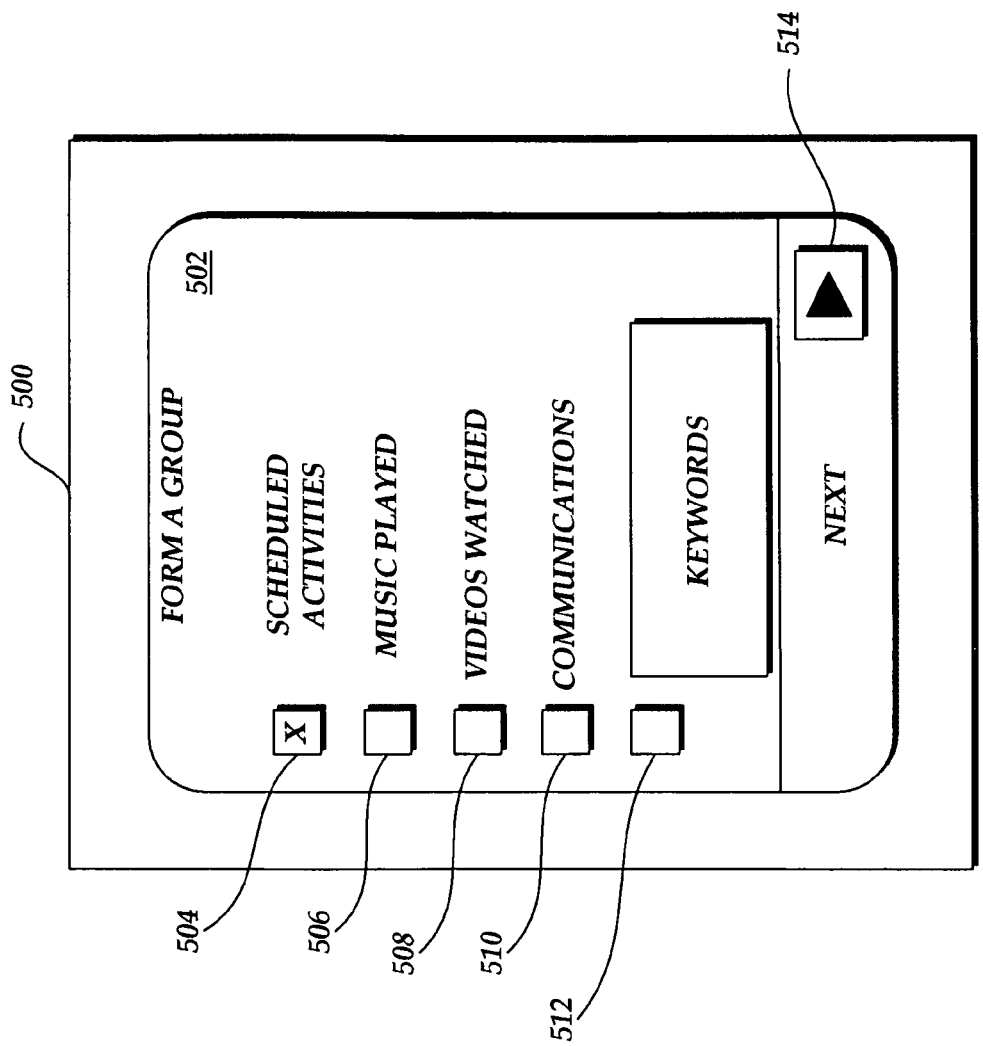

GROUP BASED INFORMATION DISPLAYS

BACKGROUND

Generally described, telecommunication devices and communication networks facilitate the collection and exchange of information. Utilizing a communication network and relevant communication protocols, a telecommunication device can engage in audio or data communications with other telecommunication devices, such as voice calls, video calls, messaging (e.g., short message service ("SMS") or multimedia messaging service ("MMS")), content streaming, instant messaging, resource browsing (e.g., Web browsing), and the like.

To facilitate communications, telecommunication devices can be associated with software and hardware components that allow the telecommunication device to maintain contact information, such as telephone numbers, email addresses, messaging addresses, etc., utilized to establish and engage in communications via available communication channels. Typically, such contact information is maintained as contact information in which all known contact information for an identified entity, such as user, can be presented to a telecommunication device user. For example, a telecommunication device may present a user interface in which the contact information associated with a selected individual is presented in a list-based format. In another example, a telecommunication device with voice calling functionality may maintain a "last call list" that keeps track of telephone numbers of the most recent incoming or outgoing calls from the telecommunication device.

Although contact management user interfaces and software can facilitate the input and management of contact information for a larger set of contacts, typical contact management approaches can become deficient as the set of entities associated with a user grows. In one example, typical call list approaches are limited in the number of contacts identified in the user interfaces (e.g., the last 4 numbers called). Accordingly, such approaches can become deficient as the number of incoming or outgoing communications (e.g., voice calls) increases because potentially desired contacts are removed from the display based on order of the most recent incoming or outgoing communications.

In another example, typical contact management approaches relate to the presentation of the entire set of contacts that are associated with a user, such as in alphabetical order. As the number of contacts maintained in the telecommunication device, or on behalf of the telecommunication device, users may have increased difficulty in identifying the contact information of specific entities. Additionally, for each contact, the typical contact management approach identifies all known contact information (e.g., phone numbers, IM aliases, email addresses, etc.) without regard to a desired, or preferred, communication method.

In addition to the management of contact information accessible by a telecommunication device, current approaches to manage applications, or other executable components, on telecommunication device can be inefficient in relation to the incorporation of contacts. One approach to managing applications or other executable components relates to user interface in which the set of available application or executable components are presented in a desktop metaphor. In a typical desktop metaphor, each available application or executable component is represented on the user interface by a selectable display object that causes the initiation, or execution of the display object. For example, a user can initiate an email application by selecting a representative display object from the user interface. In another example, a user can interact with social networking services by selecting an executable component that generates an interface for posting information or displaying information. In such a desktop metaphor, the initiation and selection of applications or executable components are independent on the grouping of users. For example, assume a user that is a member of sports team wishes to access a game schedule, post pictures from a previous game to the other team members, and communicate a private message to the other team members. Under the typical desktop metaphor approach, such an individual would be required to independently access each corresponding application (e.g., a calendaring application, a sharing application and a messaging application) by selecting each application from the presentation of all available applications. Additionally, the user would further be required to utilize the interfaces presented by each selected application to control the receipt of information transmitted (e.g., an email distribution list and a sharing application distribution list). Accordingly, such approaches do not efficiently facilitate group-based interaction.

BRIEF DESCRIPTION OF THE DRAWINGS

The foregoing aspects and many of the attendant advantages of the present disclosure will become more readily appreciated as the same become better understood by reference to the following detailed description, when taken in conjunction with the accompanying drawings, wherein:

FIG. 2 is a block diagram illustrative of components of a telecommunication device for use the generation, management and display of group-based information;

FIGS. 5A-5C are illustrative user interfaces generated on a telecommunication device for generating group-based information based on user inputs.

DETAILED DESCRIPTION

Figure 1:
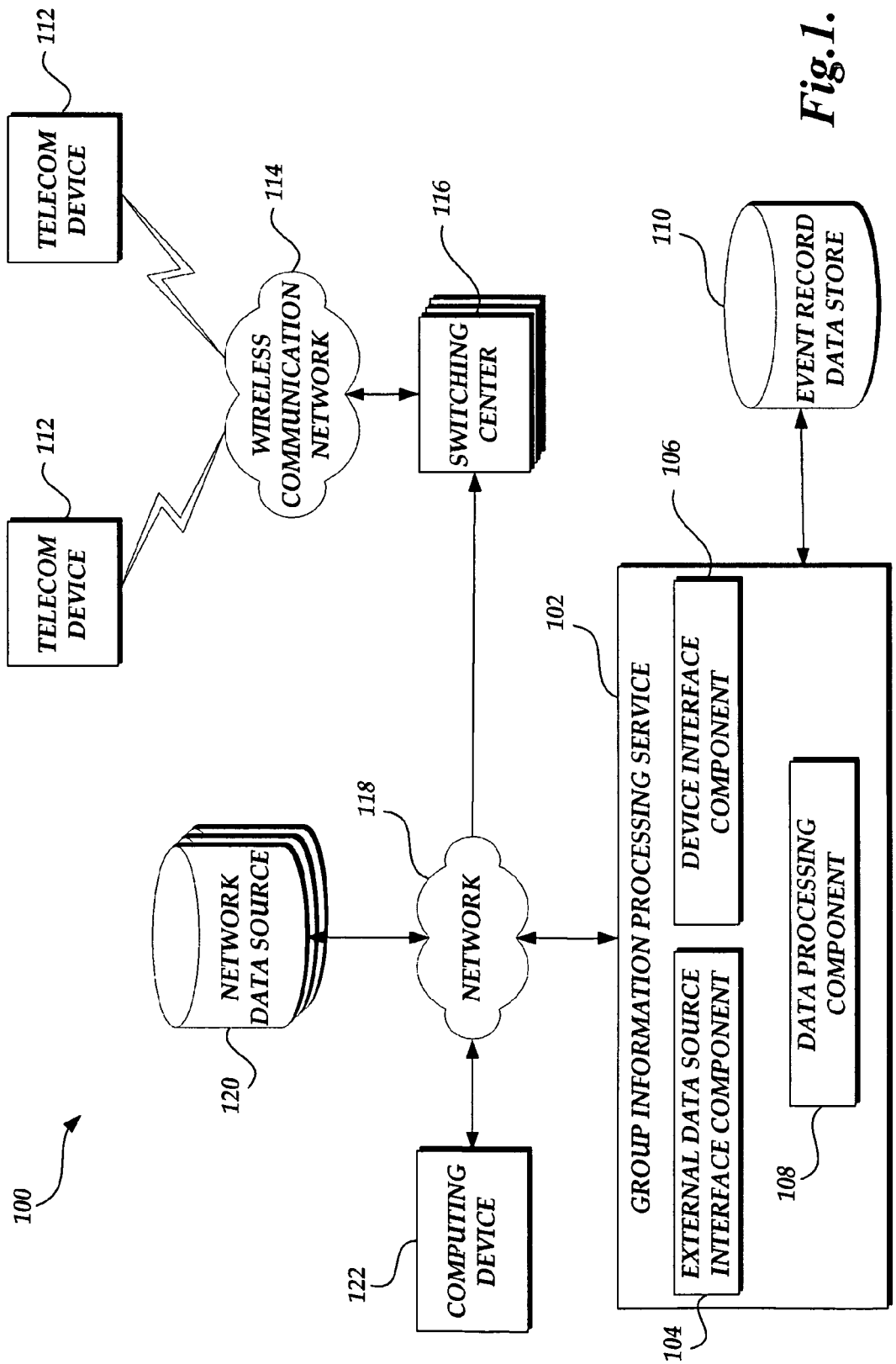
FIG. 1 is a block diagram illustrative of a telecommunication environment including a number of telecommunication devices and a group processing service.

Generally described, aspects of the present disclosure relate to the management of contact information and applications in group-based information displays. In an illustrative embodiment, the group-based information displays correspond to a collection of display objects representative of either contacts associated with a user or applications or other executable components that are executable, or otherwise accessible, via a telecommunication device. The group-based information displays can be logically organized according to subject matter organizational criteria. The subject matter organizational criteria can include, for example, organization or other affiliates criteria, event-based or activity based criteria, topic-based criteria, and the like. By accessing group-based information displays generated on a display, telecommunication device users can initiate one or more actions by the selection or manipulation of display objects corresponding to applications or executable components. Additionally, as applicable, the user can limit, or otherwise apply, the initiated actions to contacts identified, or otherwise associated, with specific group-based information displays.

In accordance with another embodiment, a group information processing service can facilitate the generation and management of group-based information, such as for the generation of group-based information displays. Specifically, the group information processing service utilizes one or more group-based information templates and contact processing information to determine a set of available contacts and applications or other executable components for inclusion in group-based information. The determination of the contacts or applications or other executable components may be completed automatically without requiring user interaction. Alternatively, at least some portion of the process may require, or provide for, at least some user interaction for the selection or management of the contacts or applications or other executable components included in group-based information.

Although aspects of the present disclosure will be described with regard to an illustrative telecommunication environment and component interactions, communication protocols, flow diagrams and user interfaces, one skilled in the relevant art will appreciate that the disclosed embodiments are illustrative in nature and should not be construed as limiting. Specifically, although the term telecommunication device is used in this document, the term represents any type of device having a component for communicating with one or more other devices via one or more communication paths. Such communication paths can include wireless communication paths (via infra-red, RF, optical, terrestrial, or satellite communication media) and wired communication paths. Additionally, although the present disclosure references a telecommunication device, one skilled in the relevant art will appreciate that a telecommunication device may also be referred to as a wireless computing device, a mobile communication device, or a computing device. Examples of telecommunication devices are described below with regard to FIG. 1. Accordingly, reference to a telecommunication device should not be interpreted as including any particular functionality or operation not described in the present disclosure. Still further, although the present disclosure is described with regard to specific group-based information displays and specific methodologies and frameworks for generating group-based information, the present disclosure should not be construed to require combination of the disclosed embodiments or any specific variation unless such combination or variation is expressly identified.

With reference now to FIG. 1, a block diagram illustrative of a telecommunication environment 100 will be described. The telecommunication environment 100 can include a group information processing service 102. In an illustrative embodiment, the group information processing service 102 may be utilized to provide, maintain or transmit group-based information to one or more telecommunication devices, as will be described below. The group-based information may be generated, at least in part, from information corresponding to interaction with individual users of telecommunication devices and maintained in a group-based information data store 110. Additionally, the group information processing service 102 may incorporate additional information from external sources, such as network-based data sources 120, into the group-based information. Such network-based data sources may include web sites, location based services, social network services, telecommunication services, message publication services, etc. The group-based information data store 110 can also maintain template information, meta-data and the like for use in the generation of additional group-based information. While the group-based information data store 110 is depicted in FIG. 1 as being local to the group information processing service 102, those skilled in the art will appreciate that the group-based information data store 110 may be remote to the group information processing service 102 and/or may be a network based service itself.

While the group information processing service 102 is depicted in FIG. 1 as implemented by a single computing device in the telecommunication device communication environment 100, this is illustrative only. The group information processing service 102 may be embodied in a plurality of computing devices, each executing an instance of the group information processing service. A server or other computing device implementing the group information processing service 102 may include memory, processing unit(s), and computer readable medium drive(s), all of which may communicate with one another by way of a communication bus. The network interface may provide connectivity over the network 118 and/or other networks or computer systems. The processing unit(s) may communicate to and from memory containing program instructions that the processing unit(s) executes in order to operate the group information processing service 102. The memory generally includes RAM, ROM, and/or other persistent and auxiliary memory.

As illustrated in FIG. 1, the group information processing service 102 can include an external data source interface component 104 for obtaining external information from network data sources 120, such as location data, contact data, and other supplemental data that can be incorporated, directly or indirectly, into the group-based information. Examples of external information can include images of an event location, digital media, social networking information, and the like. The group information processing service 102 can also include a device interface component 106 for obtaining information from one or more telecommunication devices (e.g., location data for telecommunication device(s), IP addresses assigned to computing device(s), etc.). The group information processing service 102 can further include a data processing component 108 for processing telecommunication device information and external information in generating various types of group-based information or to provide group-based information upon request.

One skilled in the relevant art will appreciate that the group information processing service 102 may correspond to a number of computer devices, such as server computing devices. Additionally, the external data source interface component 104, device interface component 106, and data processing component 108 may be implemented in a single computing device or across multiple computing devices. One skilled in the relevant art will also appreciate that the group information processing service 102 may include any one of a number of additional hardware and software components that would be utilized in the illustrative computerized network environment to carry out the illustrative functions of the service 102 or any of the individually identified components.

With continued reference to FIG. 1, the telecommunication device communication environment 100 can include a number of telecommunication devices 112 or other computing devices 122, each associated with a user. The telecommunication devices 112 or other computing devices 122 can generate the group-based information displays that facilitate interaction of a user with other users or other network-based resources. The telecommunication devices 112 can correspond to a wide variety of devices or components that are capable of initiating, receiving or facilitating communications over a communication network including, but not limited to, personal computing devices, electronic book readers (e.g., e-book readers), hand held computing devices, integrated components for inclusion in computing devices, home electronics, appliances, vehicles, machinery, landline telephones, network-based telephones (e.g., voice over IP ("VoIP"), cordless telephones, cellular telephones, smart phones, modems, personal digital assistants, laptop computers, gaming devices, media devices, and the like. In an illustrative embodiment, the telecommunication devices 112 include a wide variety of software and hardware components for establishing communications over one or more communication networks, including wireless communication network 114, a wired communication network (not shown), or an IP-based telecommunication network (not shown). Illustrative components of a telecommunication device 112 will be described in greater detail with regard to FIG. 2.

In an illustrative embodiment, the telecommunication device communication environment 100 can include a number of additional components, systems and/or subsystems for facilitating communications with the telecommunication devices 112, 112b and/or the group information processing service 102. The additional components can include one or more switching centers 116 for establishing communications with the telecommunication devices 112, 112b via the wireless communication network 114, such as a cellular radio access network, a wireless network based on the family of IEEE 802.11 technical standards ("WiFi"), a wireless network based on IEEE 802.16 standards ("WiMax"), a converged wireless telecommunication network such as Unlicensed Mobile Access ("UMA"), or General Access Network ("GAN"), and other wireless networks. The operation of mobile communication networks, such as wireless communication network 114 are well known and will not be described in greater detail. As illustrated in FIG. 1, the switching center 116 includes interfaces for establishing various communications via a communication network 118, such as the Internet, intranets, private networks and point to point networks, generally referred to as the "network." Although the wireless communication network 114 is illustrated as a single communication network, one skilled in the relevant art will appreciate that the communication network can be made up of any number of public or private communication networks and/or network connections.

As noted above, the telecommunication device communication environment 100 can further include one or more network data sources 120 for providing external information to the group information processing service 102. The network data sources 120 may include a number of computing devices for obtaining and processing requests for information from either the group information processing service 102 and/or the telecommunication devices 112.

With reference now to FIG. 2, illustrative components of a telecommunication device, such as telecommunication device 112, for use in the creation and display of group-based information displays will be described. The telecommunication device 112 may include one or more processing units 202, such as one or more CPUs. The telecommunication device 112 may also include system memory 204, which may correspond to any combination of volatile and/or non-volatile storage mechanisms. The system memory 204 may store information which provides an operating system component 206, various program components 208, program data 210, a group management component 222 and/or other components. As will be explained in greater detail below, the group management component 222 stored in system memory of the telecommunication device 112 may perform all or some of the functions described above in connection with the data processing component 109 of the group information processing service 102 (FIG. 1). The above-enumerated list of components is representative and is not exhaustive of the types of functions performed, or components implemented, by the telecommunication device 112. One skilled in the relevant art will appreciate that additional or alternative components may also be included in the telecommunication device 112 to carry out other intended functions such as a mobile telephone functions.

The telecommunication device 112 performs functions by using the processing unit(s) 202 to execute instructions provided by the system memory 204. The telecommunication device 112 may also include one or more input devices 212 (keyboard, mouse device, specialized selection keys, etc.) and one or more output devices 214 (displays, printers, audio output mechanisms, etc.). Illustrative user interfaces for a telecommunication device 112 will be described with regard to FIGS. 3 and 5, described below.

With continued reference to FIG. 2, the telecommunication device 112 may also include one or more types of removable storage 216 and one or more types of non-removable storage 218. Still further, the telecommunication device 112 can include communication components 220 for facilitating communication via wired and wireless communication networks, such as the wireless communication network 114 and network 118 (FIG. 1). Examples of various communication protocols include, but are not limited to, Bluetooth, the family of IEEE 802.11 technical standards ("WiFi"), the IEEE 802.16 standards ("WiMax"), short message service ("SMS"), voice over IP ("VoIP") as well as various generation cellular air interface protocols (including, but not limited to, air interface protocols based on CDMA, TDMA, GSM, WCDMA, CDMA2000, TD-SCDMA, WTDMA, LTE, OFDMA, and similar technologies).

As previously described, in accordance with an aspect of the present disclosure, a telecommunication device 112 can generate one or more group-based information displays on a user interface via an output device 114. In an illustrative embodiment, the group-based information displays include various display objects that have been selected, at least in part, by evaluation of organizational criteria. Examples of organizational criteria include, but are not limited, to as organization or affiliation criteria, event-based or event driven criteria, topic or keyword based-criteria, and the like. In one aspect, the group-based information displays can include a selection of one or more display objects corresponding to contacts associated with a user or user account. The identification of contacts (and the corresponding contact information) may be provided by multiple data sources, such as address books, data files, network sources, etc. In another aspect, the group-based information displays can include a selection of one or more display objects corresponding to applications or executable components that can be executed by the telecommunication device 112. Each of the applications or executable components may be configured in accordance with the organizational criteria or as a function of one or more contacts included in the group-based information.

In an illustrative embodiment, the display objects may be selectable by a user via any one of a variety of input methods and devices. Additionally, the determination of the display objects that are included in group-based information display may be predetermined, automatically determined (in real time or semi-real time), or manually configured/managed according to user-specified criteria. Further, the display and formatting of the display objects and the group-based information displays may be specified according to specific telecommunication device capabilities, service provider specifications, or user configurations.

In accordance with another embodiment, the telecommunication device 112 can generate a series of group-based information displays on a user interface. As described above, each group-based information display includes a selection of one or more display objects corresponding to contacts or applications or other executable components. The group-based information display is based on organizational criteria, such as organization or affiliation criteria, event-based or event driven criteria, topic or keyword based-criteria, and the like. Additionally, in this embodiment, a set of group-based information displays can be displayed by the telecommunication device 112 as a series of displays that can be manipulated via standard input techniques, such as touch screen gestures, keypad gestures, trackball movements, etc. The series of group-based information displays can be displayed in a manner to emulate movement along a liner path, circular path or other geometric or non-geometric paths.

In an illustrative embodiment, the set of group-based information displays can have one or more common display objects corresponding to contacts, one or more common display objects corresponding to applications or executable components, or no common display objects. For example, a single contact may be represented as a display object in more than one of the set of group-based information displays. Likewise, an application or executable component may be represented in more than one of the set of information displays. As will be explained, however, the telecommunication device 112 may initiate a different action from a display object corresponding to the same contact or application or executable component. Additionally, in an embodiment, the series of group-based information displays can be displayed on the telecommunication device 112 without utilization of a desktop metaphor on the screen display.

Figure 3A:
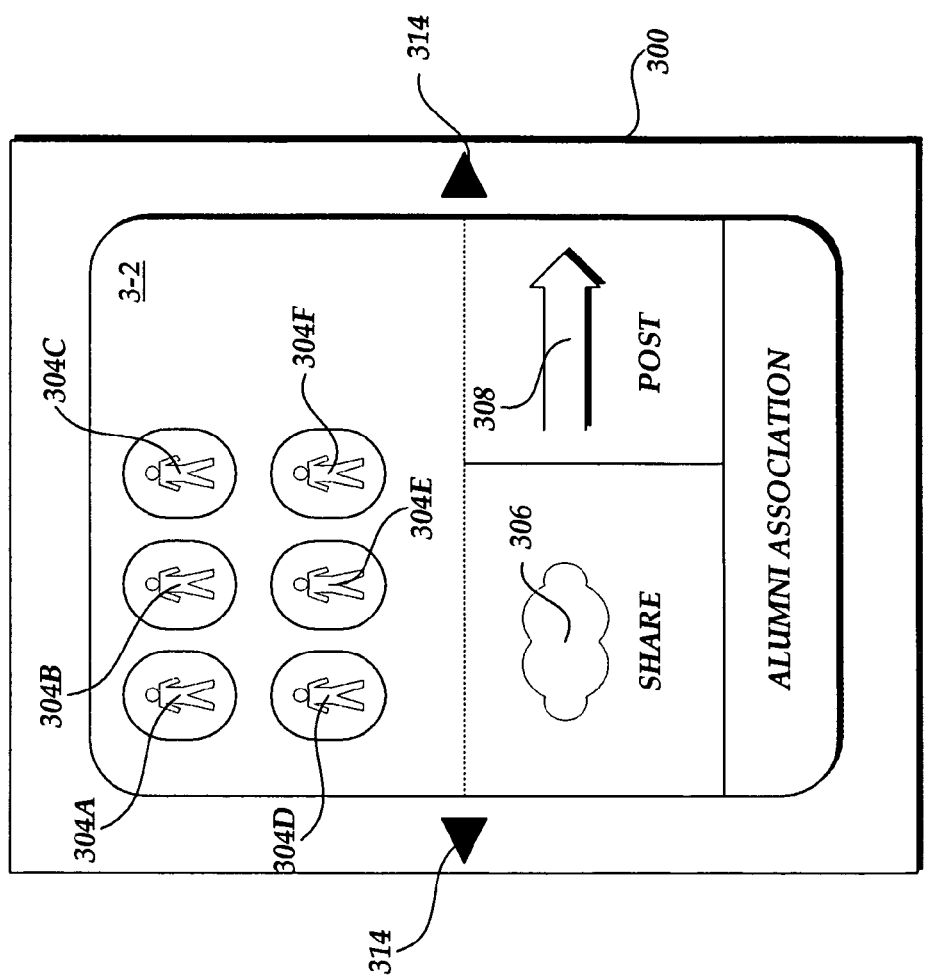
FIGS. 3A-3C are illustrative user interfaces generated on a telecommunication device for displaying group-based information displays.
Figure 3B:
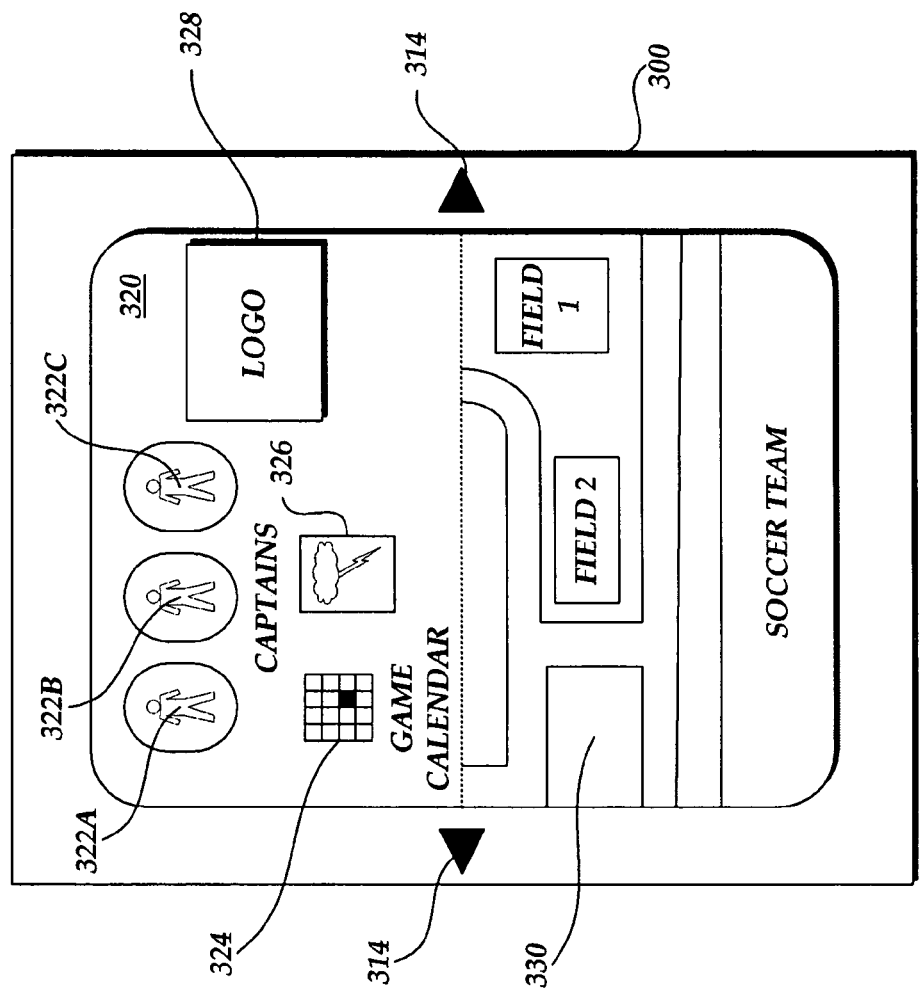
Figure 3C:
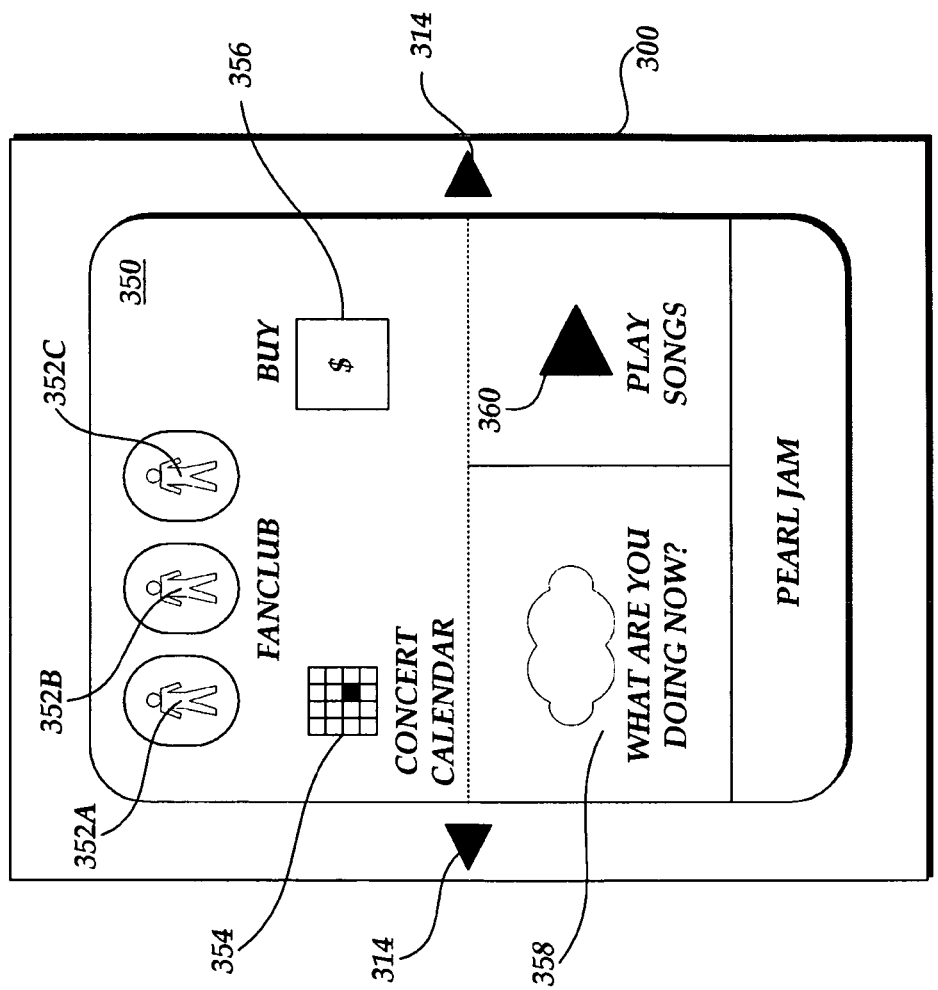

With reference now to FIGS. 3A-3C, illustrative user interfaces generated on a telecommunication device for displaying group-based information displays will be described. The user interfaces illustrated in FIGS. 3A-3C correspond to individual group-based information displays generated on a display screen 300 corresponding to an output device 214 (FIG. 2). One skilled in the relevant art will appreciate that the group-based information displays may vary according to the display capabilities and dimensions of the telecommunication device 112. Additionally, the group-based information displays may further vary according to service plan criteria provided by various service providers, the group-based information displays can also be modified, at least in part, based on criteria provided by service providers, such as a service provider or service providers associated with the wireless communication network. Still further, at least some portion of the group-based information displays may be customizable by users associated with the telecommunication device 112.

Turning now to FIG. 3A, the display screen 300 includes a group-based information display 302 for displaying display objects according to organizational criteria. In this illustrative example, the organizational criteria correspond to organization or affiliation criteria. Specifically, the display objects in the group-based information display 302 correspond to the contacts and application or other executable components have been selected by some association to a common organization or affiliation (e.g., the "Alumni Association"). In an illustrative embodiment, the association with the organization or affiliation may be explicit, such as via information associated with user profiles via tags or labels. In other embodiments, the association may be inferred according to keyword processing, image processing, or inferences based on relationships with other contacts/applications known to be associated with the organization or affiliation.

With reference to FIG. 3A, in a first portion of the group-based information display 302, a set of display objects 304A-304F correspond to six contacts associated with the user, or user account, of the telecommunication device 112. The display objects 304A-304F may be selectable such that selection of any of the display can initiate some type of action on the telecommunication device 112. Examples of the actions can include the display of detailed contact information, the initiation of communications with a selected contact according to a pre-selected communication method or a most recently used communication method (e.g., a SMS message or phone call), the generation of additional user interfaces, and the like.

Illustratively, display objects 304A-304F corresponds to a portion of the user's contacts which are accessible via the user's wireless device and which have some association with the organizational criteria. For example, each of the contacts associated with the display objects may be associated with the organization ("Alumni Association") in accordance with user profile information maintained by the group information processing service or other Web service. In one illustrative embodiment, the subset of contacts is selected by the user and can be subsequently maintained, for example, in data store 224 of the wireless device 112.

In another embodiment, a portion of the display objects 304A-304F can be selected automatically in accordance with one or more other factors. In one example, one factor can be a frequency of communication between the user and one or more user contacts accessible by the wireless device 112. In this example, the group management component 222 monitors communications between the user and each of the user's contacts accessible by the wireless device 112 and maintains data associated with the monitored communications. Based on the monitored communications and corresponding maintained data, the group management component 222 may determine a frequency of communication between the user and each of the user's contacts. This information can then be used to determine the remaining portion of the subset of contacts.

With continued reference to FIG. 3A, in another portion of the group-based information display 302, a set of display objects corresponding to applications or other executable components are displayed. In one embodiment, the selection of the display object 306 can automatically initiate a corresponding application or cause the telecommunication device 112 to execute one or more components. Specifically, the group-based information display 302 includes a display object 306 for initiating one or more applications that allow for the transmission, or other delivery of data, to the contacts associated with the group-based information display 302. Examples of such applications or executable components can include email applications, SMS or MMS applications, IM applications, and the like. In another embodiment, the selection of the display object 306 can cause the telecommunication device 112 to display one or more other user interfaces for selecting different applications or other executable components that facilitate sharing or configuring the identified applications or other executable components. Examples of such application or executable components can include applications that access network resources (e.g., Web pages) for distributing content, SMS or MMS application, IM applications, and the like.

In a similar manner, the group-based information display 302 also includes a display object 308 for initiating one or more applications that allow for the uploading, or other delivery of data, to a resource on the communication network 118. Examples of such applications or executable components can include social networking resources, file sharing resources, and the like. As previously described, although the number and function of display objects 304, 306 and 308 are illustrative, these display objects may have been automatically selected during a group-based information generation process. Additionally, some of the display objects may be manually configured or managed by a user or system administrator. The group-based information display 302 further includes two controls 310 that can be manipulated to display a series of group-based information displays on the telecommunication device 112. As previously described, a set of group-based information displays may be presented on a display screen of the telecommunication device 118 in a manner to emulate a linear path, circular path, and other geometric or non-geometric paths.

Turning now to FIG. 3B, the display screen 300 includes a second embodiment of a group-based information display 320 for displaying display objects according to organizational criteria. In this illustrative example, the organizational criteria correspond to event based criteria. Specifically, the display objects in the group-based information display 320 correspond to the contacts and applications or other executable components have been selected by some association to an identifiable event or set of events (e.g., a set of games/ practices associated with the a soccer team). One skilled in the relevant art will appreciate that the same or a similar group may have been formed utilizing affiliation criteria. However, not all event criteria may have corresponding affiliation or organizational criteria.

In a first portion of the group-based information display 320, a set of display objects 322A-332C correspond to three contacts associated with the user, or user account, of the telecommunication device 112. In an illustrative embodiment, the display objects 322A-322C are selectable such that selection of any of the display can initiate some type of action, as previously described. Additionally, in this illustrative example, the set of display objects 322A-322C have been selected based on additional criteria corresponding to the event criteria, in this case the captains of the soccer team. In this example, it can be assumed that the contacts corresponding to display objects 322A-322C were associated with tags, or other labels, the facilitated their further identification as team captains. Such information may be maintained by, or otherwise made accessible to, the group information processing service 102.

Similar to group-based information display 302, in a second portion of group-based information display 320, two display objects 324 and 326 correspond to two applications or other executable components associated with the event criteria. Specifically, the group-based information display 320 includes a display object 326 for initiating one or more applications for calendaring information. The calendaring information may be associated with the event criteria (e.g., soccer games) or derived from information associated with the three contacts corresponding to display objects 322A-322B (e.g., team meetings or social engagements on individual calendaring data). The group-based information display 320 also includes a display object 326 for initiating one or more applications or other executable components for obtaining information about weather. Illustratively, the application 326 may be configured in a manner such that initiation of the application is based, at least in part, on the event criteria (e.g. location of practices/games at the time of the practice/games). Any one of a variety of techniques may be utilized to configure the application 326.

With continued reference to FIG. 3B, the group-based information display 320 further includes two display objects 328 and 330, at least which a portion of the information associated with the display object (or execution of the application or other executable component) includes obtaining information from a network data source 120 (FIG. 1). Specifically, display object 328 corresponds to an image (e.g., a team logo) that could have been obtained or updated by a network resource (e.g., Web page) sponsored by the soccer team. Additionally, display object 330 corresponding to mapping information or a map service application for displaying maps/directions. In an manner previously described, the application may be configured such that initiation of the application is based, at least in part, on the events making up, or otherwise defining, the event criteria (e.g., mapping locations for the practices/games). The group-based information display 320 further includes two controls 310 that can be manipulated to display of a series of group-based information displays on the telecommunication device 112.

Turning now to FIG. 3C, the display screen 300 includes a third embodiment of a group-based information display 350 for displaying display objects according to organizational criteria. In this illustrative example, the organizational criteria correspond to topic based, or keyword-based criteria. Specifically, the display objects included in the group-based information display 350 correspond to the contacts and applications or other executable components have been selected by some association to an identifiable topic or keyword (e.g., "Pearl Jam"). Similar to the group-based information displays 302 and 320, in a first portion of the group-based information display 350, a set of display objects 352A-352C correspond to three contacts associated with the user, or user account, of the telecommunication device 112. The display objects 322A-322C are selectable such that selection of any of the display can initiate some type of action by the telecommunication device 112, as previously described. Additionally, in this illustrative example, the set of display objects 322A-322C have been selected based on additional criteria corresponding to the topic criteria, in this case, members of a fan club.

Also similar to group-based information displays 302 and 320, in a second portion of group-based information display 350, four display objects 354, 356, 358 and 360 correspond to applications or other executable components associated with the topic criteria. Specifically, the group-based information display 320 includes a display object 354 for initiating one or more applications for calendaring information associated with the topic criteria (e.g., a concert calendar). The group-based information display 350 also includes a display object 356 for initiating one or more applications or other executable components for initiating the purchase of merchandise associated with the topic criteria or the contacts identified with display objects 322A-322C (e.g., a commerce-based network resource or a auction-based network resource). The group-based information display 350 further includes a display object 358 for initiating one or more applications corresponding to a social network resource (e.g., a social network Web site) in which a user can post statements regarding a current status, thought or action. Finally, the group-based information display 350 also includes a display object 360 for initiating the playback of media, such as audio or video files. The application 360 may be configured with the topic criteria such that media associated with the topic criteria is accessible or otherwise prioritized. The media may be stored locally on the telecommunication device 112 or accessed via the communication network 118 (e.g., streaming). The group-based information display 320 further includes two controls 310 that can be manipulated to display of a series of group-based information displays on the telecommunication device 112.

As also previously described, in accordance with an aspect of the present disclosure, a group information processing service 102 can generate utilize various templates and user interfaces for the generation of group-based information. In such an embodiment, the group information processing service 102 can automatically select the contacts eligible to be associated with group-based information. For example, the contacts may be first limited to contacts known the user (directly or indirectly). The contacts may be additionally limited or filtered according to the organizational criteria associated with the group-based information. In a similar manner, the group information processing service 102 can automatically select the applications or other executable components that will be associated with the group-based information. Still further, the selected applications or other executable components may be configured in accordance with the organizational criteria or the selected contacts include in the group-based information display. Examples of such configurations were previously described. Thereafter, the group information processing service 102 can obtain additional user interaction information in modifying, or otherwise adjusting, the display objects displayed in the resulting group-based information displays.

Figure 4:
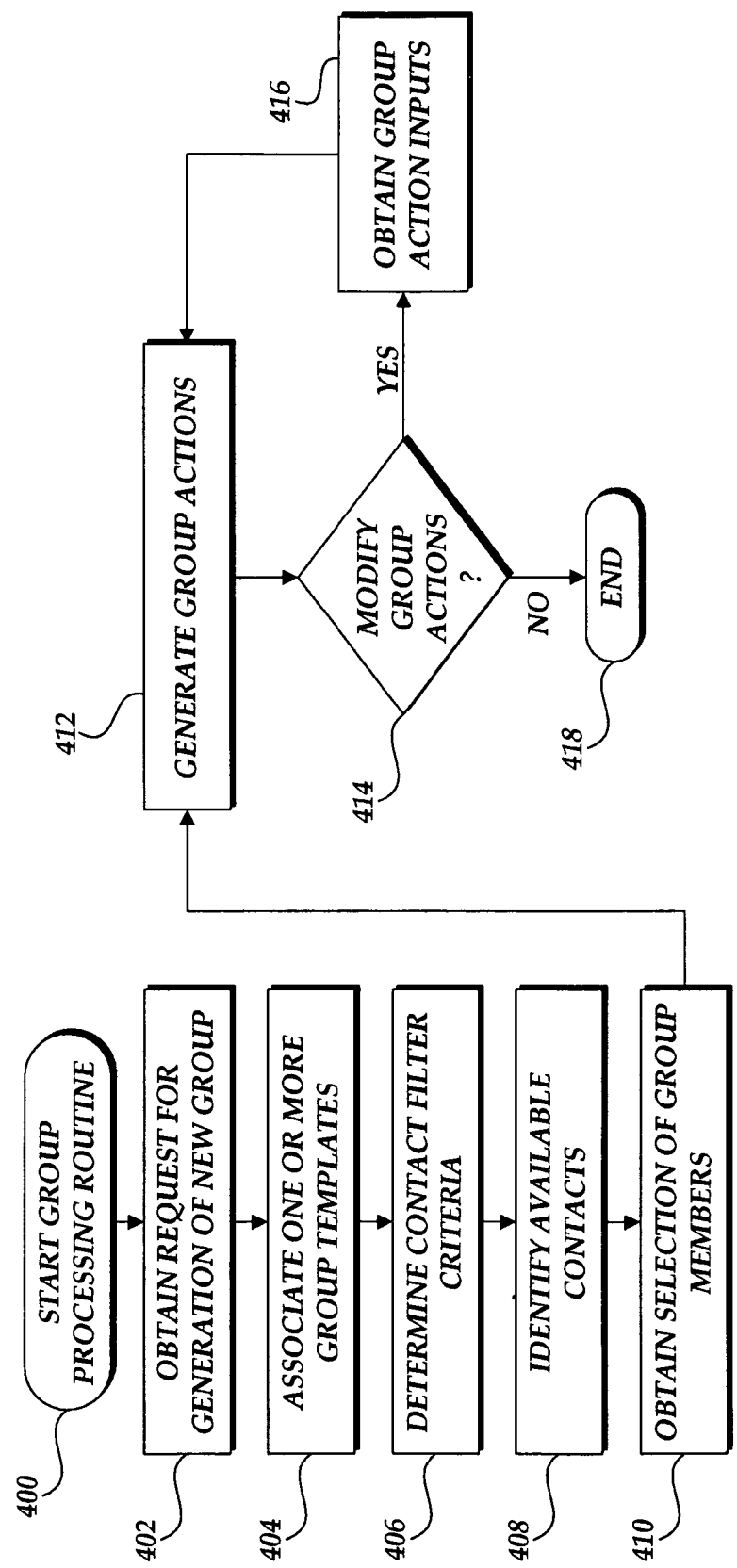
FIG. 4 is a flow diagram of an illustrative of a group-based information processing routine implemented by a group information processing service to generate group-based information.

With reference now to FIG. 4, a flow diagram illustrative of a group-based information processing routine 400 implemented by a group information processing service 102 to generate group-based information will be described. Routine 400 will be described as being generally performed by the group information processing service 102. However, one skilled in the relevant art will appreciate that actions/steps outlined for routine 400 may be implemented by one or many computing devices/components that are associated with the telecommunication device management environment 100. Accordingly, any functionality described in reference to the routine 400 could be generally performed by any component in the telecommunication device management environment 100, including group management module 222 of the telecommunication device 112, other modules, or combinations thereof. Thus, the following illustrative embodiments should not be construed as limiting.

At block 402, the group information processing service 102 obtains a request for generation of a new group. In an illustrative embodiment, the request to generate a new group may be initiated by a user through the manipulation of various graphical or physical controls. Additionally, the request to generate may be generated via an alternative computing device, such as computing device 122. Alternatively, the group information processing service 102 may infer a request based on the detection of specific activities related to a group (e.g., the scheduling of events with game or practice in a description field) or the processing of information (e.g., the processing of emails identifying a particular distribution list.

At block 404, the group information processing service 102 associates one or more potential templates based on the request to form a group. Illustratively, the group information processing service 102 may maintain or more templates that include the identification of applications that can be associated with types of organizational criteria. For example, for event-based criteria, a corresponding template can specific that a group-based information display can include calendaring applications, mapping applications, social networking applications, Web logging ("Blog") applications, etc. The template information may be generated by the group information processing service 102, by other service providers such as cellular service providers, or customized according to user preferences. In one aspect, the group information processing service 102 may obtain specific user interaction/selections of the type of organizational criteria that may be utilized in forming the collection of group-based information. In another aspect, the group information processing service 102 can infer one or more organizational criteria. A sample user interface for selecting organizational criteria will be described with regard to FIG. 5A.

At block 406, the group information processing service 102 determines contact filter information for determining which contacts are eligible to be included in the group-based information. At block 408, the group information processing service 102 applies the contact filter information to the set of available contacts. As previously described, the set of contacts can correspond to a cumulative grouping of all the contacts maintained, or otherwise associated with, the user. The contact information may be maintained in one or more address books, data files, network resources, etc. The contact information does not have to include all possible contact information and the group information processing service 102 can apply the contact filter information to a subset of the available contact information. The contact filter information can correspond to filter information provided by the user or a mobile service provider. For example, the set of contacts can be filtered based on contacts identified with a particular service level, communication preference, rate plan, etc. The contact filter information can further include keywords, tags or other criteria that can be applied to user profile information to find matching or substantially matching contacts (e.g. contacts associating with keywords, labels or tags).

At block 410, the group information processing service 102 obtains a selection of the filtered contact list. In an illustrative embodiment, users may have the ability to select contacts from the filtered list. An illustrative user interface for selecting contacts will be described with regard to FIG. 5B. Additionally, in an illustrative embodiment, the selection of contacts from the filtered list may be automatically applied by inferring user selections according to ratings, frequency of use, or other feedback mechanisms. Alternatively, one skilled in the relevant art will appreciate that block 410 may be omitted. At block 412, the group information processing service 102 then generates the set of display objects corresponding to the action that will be facilitated through the group-based information display. In an illustrative embodiment, the selected set of display objects can be based on the template information. At decision block 414, a test is conducted to determine whether the group actions should be modified. If so, the routine 400 proceeds to block 416 where the group information processing service 102 obtains additional group action inputs to modify or select the previously identified activities. As previously described, users may be provided the ability to selectively modify the display of the display objects included in the group-based information displays or the appearance of the selected display objects. An illustrative user interface for selecting/modifying the group actions will be described with regard to FIG. 5C. The routine 400 then returns to block 412. Once the user has indicates that there are no further modifications required (or if none are available), the routine 400 terminates at block 418.

Figure 5B:
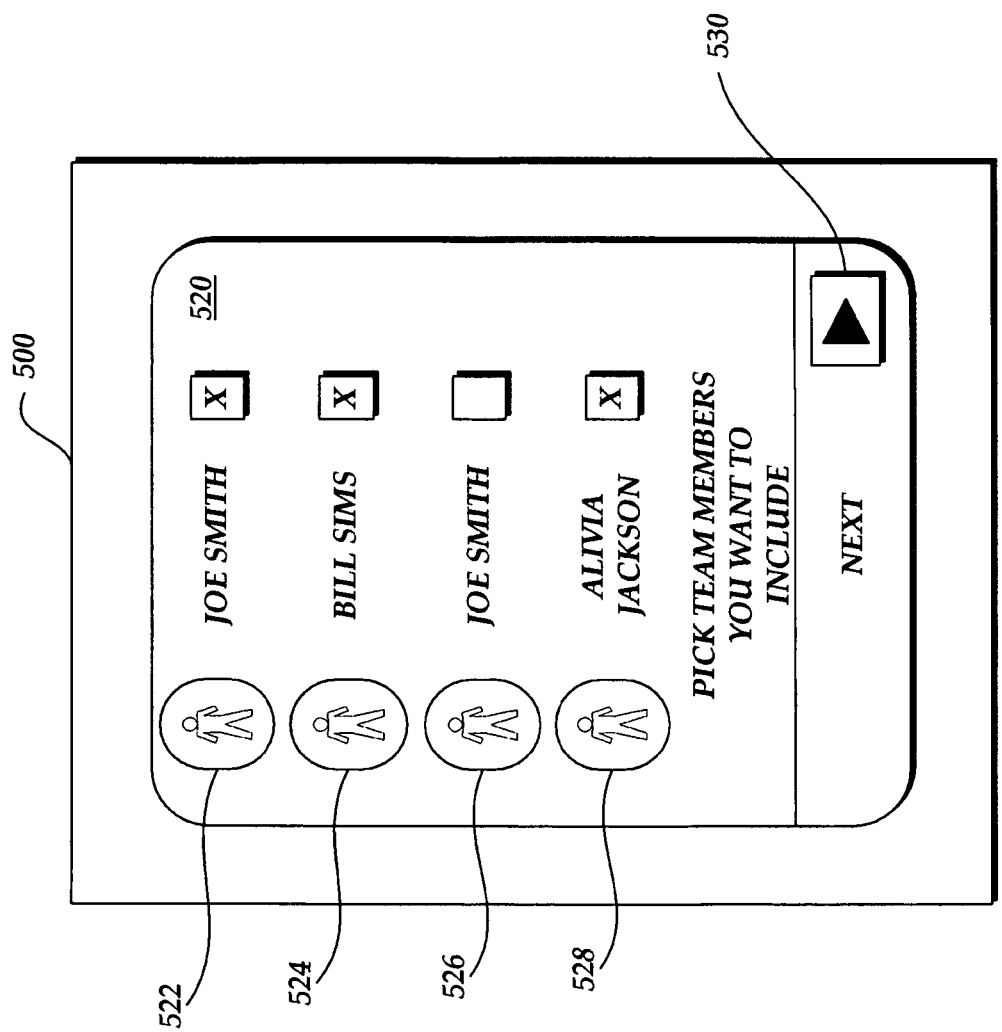
Figure 5C:
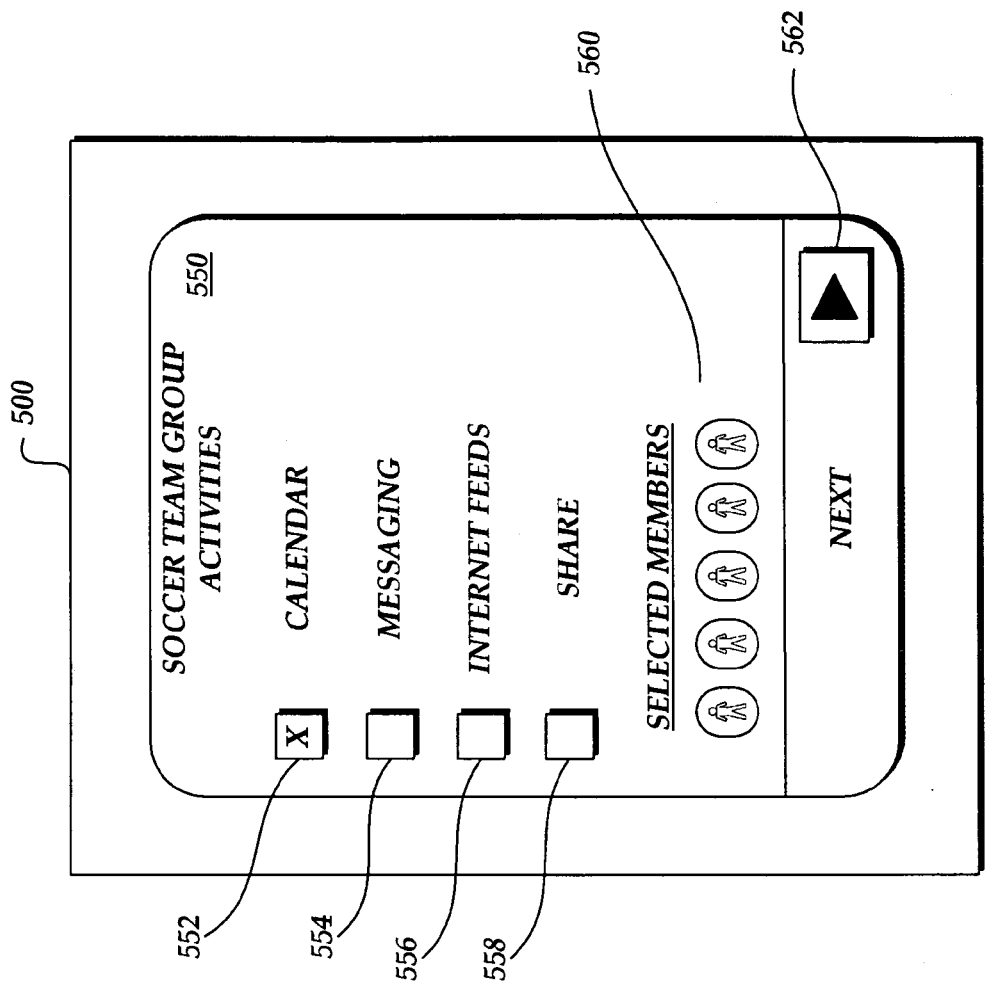

With reference now to FIGS. 5A-5C, illustrative user interfaces generated on a telecommunication device for obtaining user input for the generation of group-based information displays will be described. The user interfaces illustrated in FIGS. 5A-5C correspond to displays generated on a display screen 500 corresponding to an output device 214 (FIG. 2). One skilled in the relevant art will appreciate that the displays may vary according to the display capabilities and dimensions of the telecommunication device 112 and criteria utilized to form specific group-based information displays.

Turning now to FIG. 5A, a user interface for obtaining a user selection of the organizational criteria of the group-based information display will be described. The user interface corresponds to a display screen 500 that includes a display 502 for displaying various criteria that will be the basis for the subject matter of the group-based information display. As illustrated in FIG. 5A, the criteria can include information 504 from scheduled events (e.g., calendaring data). The criteria can also include information 506 corresponding to music media in which the user has expressed an interest, played via the telecommunication device or the like. Similarly, the criteria can include information corresponding to video watched via the telecommunication device 112. Still further, the criteria can include information 510 obtained or otherwise interpreted from communications sent via the telecommunication device 112. Finally, the criteria can include information 512 for obtaining keywords or other tags to specify topic-based keywords/criteria. The selection of which criteria are displayed to the user in the display 502 can be based on previous user activity, a current user activity, or organizational criteria associated with other group-based information displays in the telecommunication device 112. As previously described, the group information processing service 102 will utilize the selected organizational criteria to identify relevant templates user in the generation of a group-based information display. In an illustrative embodiment, the first display 502 includes one or more controls 514 for continuing the group-based information generation routine.

With reference to FIG. 5B, a user interface for obtaining a user selection of contacts used in the formation the group-based information display will be described. The user interface corresponds to a display screen 500 that includes a display 520 for displaying the filtered (or unfiltered) list of contacts that were identified by the group information processing service 102. As illustrated in FIG. 5B, the display objects 522, 524, 526 and 528 correspond to contacts associated with the user and possibly additional filtering criteria. Similarly, the second display 520 includes one or more controls 530r continuing the group-based information generation routine. As previously described, during the group-based information process, the selected contacts will be associated with the various applications or other executable components included in the group-based information display.

With final reference to FIG. 5C, a user interface for obtaining a user selection of the applications or other executable components used in the formation the group-based information display will be described. The user interface corresponds to a display screen 500 that includes a third display 550 for displaying the selected activities that are available for inclusion in the group-based information display. As illustrated in FIG. 5C, the display objects 552, 554, 556 and 558 correspond to applications or other executable components associated with the organizational criteria of the group-based information (FIG. 5A) and identified in a corresponding template. Additionally, display objects 560 corresponding to the selected contacts may be displayed to allow the user to select the actions based on the contacts that are to be included in the group. The display 550 includes one or more controls 562 continuing the group-based information generation routine.

All of the processes described herein may be embodied in, and fully automated via, software code modules executed by one or more general purpose computers or processors. The code modules may be stored in any type of computer-readable medium or other computer storage device. Some or all the methods may alternatively be embodied in specialized computer hardware. In addition, the components referred to herein may be implemented in hardware, software, firmware or a combination thereof. As such, reference in the disclosure to actions performed by a module or component relates to the execution of executable instructions by a processing device, or devices, to cause the referenced action to be preformed.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A non-transitory computer-readable medium having a computer-executable component, implemented by executing instructions on a processor associated with a telecommunication device, the computer-executable component comprising:

a group information management component operative to:
cause generation of a first group-based information display, the first group-based information display including a first subset of contacts formed in accordance with first identified organizational criteria, the first identified organizational criteria defined by a user of the telecommunication device, wherein the first subset of user contacts includes a portion of the user's contacts accessible by the telecommunication device;
determine a first subset of applications or other executable components accessible by the telecommunication device to be included in the first group-based information display based, at least in part, on the first organizational criteria, wherein the first subset of applications and other executable components are configured to incorporate the first subset of contacts and to enable the user to communicate with the first subset of contacts via the telecommunication device in a context corresponding to the first organizational criteria;
cause generation of a second group-based information display, the second group-based information display including a second subset of contacts formed in accordance with second identified organizational criteria, the second identified organizational criteria defined by the user of the telecommunication device, wherein the second subset of user contacts includes a portion of the user's contacts accessible by the telecommunication device; and determine a second subset of applications or other executable components accessible by the telecommunication device to be included in the second group-based information display based, at least in part, on the second organizational criteria, wherein the second subset of applications and other executable components are configured to incorporate the second subset of contacts and to enable the user to communicate with the second subset of contacts via the telecommunication device in a context corresponding to the second organization criteria;

wherein at least one application or other executable component included in the first group-based information display is included in the second group-based information display and wherein the at least one application or other executable component is configured differently between the at least one application or other executable component's respective inclusion in the first group-based information display and the at least one application or other executable component's respective inclusion in the second group-based information display.

2. The computer-readable medium as recited in claim 1, wherein individual contacts in the first and second subset of contacts are selected by the user of the communication device.

3. The computer-readable medium as recited in claim 1, wherein the first and second organizational criteria correspond to at least one of organization criteria, event-based criteria or topic based criteria.

4. The computer-readable medium as recited in claim 1, wherein the group information management component is further operative to transition the display of the first group-based information display and the second group-based information display.

5. The computer-readable medium as recited in claim 4, wherein the transition of the display of the first group-based information display and the second group-based information display emulates a linear path.

6. The computer-readable medium as recited in claim 1, wherein the first subset of contacts from the first group-based information display is the same as the second subset of contacts from the second group-based information display.

7. The computer-readable medium as recited in claim 1, wherein at least one application or other executable component in the first group-based information display is configured as a function of the first organizational criteria.

8. The computer-readable medium as recited in claim 1, wherein at least one application or other executable component in the first group-based information display is configured as a function of at least one of the first subset of contacts in the first group-based information display.

9. The computer-readable medium as recited in claim 1, wherein at least one application or other executable component included in the first group-based information display is excluded from the second group-based information display.

10. The computer-readable medium as recited in claim 9, wherein the first subset of applications or other executable components from the first group-based information display is the same as the second subset of applications or other executable components from the second group-based information display.

11. The computer-readable medium as recited in claim 1, wherein first subset of applications or other executable components includes one or more applications or other executable components, wherein the one or more applications or other executable components are excluded from the second subset of applications or other executable components.

12. The computer-readable medium as recited in claim 1, wherein the at least one application or other executable component is configured differently between its respective inclusion in the first group-based information display and its respective inclusion in the second group-based information display in accordance with at least one of a difference between the first subset of contacts and the second subset of contacts or a difference between the first organizational criteria and the second organizational criteria.

13. A computer-implemented method comprising:

identifying a first subset of contacts selected by a user of a communication device based on first organizational criteria, the first organizational criteria defined by the user of the communication device, wherein the first subset of contacts includes a portion of the user's contacts accessible by the communication device and wherein the first subset of contacts are associated with the first organizational criteria;

identifying a first subset of applications or other executable components accessible by the telecommunication device based, at least in part, on the first organizational criteria wherein the first subset of applications or other executable components are configured to incorporate the first subset of contacts and to enable the user to communicate with the first subset of contacts via the communication device in a context corresponding to the first organizational criteria;

causing display of a first group-based information incorporating the first subset of contacts and the first subset of applications or other executable components;

identifying a second subset of contacts selected by a user of a communication device based on second organizational criteria, the second organizational criteria defined by the user of the communication device, wherein the second subset of contacts includes a portion of the user's contacts accessible by the communication device and wherein the second subset of contacts are associated with the second organizational criteria;

identifying a second subset of applications or other executable components accessible by the telecommunication device based, at least in part, on the first organizational criteria wherein the second subset of applications or other executable components are configured to incorporate the second subset of contacts and to enable the user to communicate with the second subset of contacts via the communication device in a context corresponding to the second organizational criteria; and causing display of a second group-based information incorporating the second subset of contacts and the second subset of applications or other executable components, wherein at least one application or other executable component included in the first group-based information is included in the second group-based information and wherein the at least one application or other executable component is configured differently between the at least one application or other executable component's respective inclusion in the first group-based information and the at least one application or other executable component's respective inclusion in the second group-based information;

wherein the method is implemented by a computing system.

14. The method as recited in claim 13, wherein each contact in the first subset of contacts is selected by the user of the communication device.

15. The method as recited in claim 13, wherein the first organizational criteria include at least one of organization criteria, event-based criteria or topic based criteria.

16. The method as recited in claim 13, wherein the first subset of the applications or other executable components correspond to at least one of an application or other executable component for sharing information or posting information to a network resource.

17. The method as recited in claim 13, wherein the first subset of the applications or other executable components correspond to at least one application or other executable component for providing calendaring information.

18. The method as recited in claim 13, wherein the first subset of the applications or other executable components correspond to at least one of an application or other executable component for interacting with at least one application accessible on the communication device.

19. The method as recited in claim 13, wherein the first subset of the applications or other executable components correspond to at least one application or other executable component for interacting with at least one application hosted on a communication network.

20. The method as recited in claim 13 further comprising configuring the first subset of applications or executable components based on the first organizational criteria.

21. The method as recited in claim 13 further comprising configuring the first subset of applications based on at least one contact in the first subset of contacts.

22. The method as recited in claim 13, wherein at least one of the first subset of applications or executable components is configured based on at least one criterion of the first organizational criteria and at least one contact in the first subset of contacts.

23. The method as recited in claim 13 further comprising transitioning the display of the first group-based information to the display of the second group-based information.

24. The method as recited in claim 13, wherein the second subset of contacts includes at least one contact in the first subset of contacts.

25. The method as recited in claim 13, wherein the second subset of applications or other executable components excludes at least one application or other executable component in the first subset of applications or other executable applications.

26. The method as recited in claim 13, wherein the at least one application or other executable component is configured differently between its respective inclusion in the first group-based information and its respective inclusion in the second group-based information in accordance with at least one of a difference between the first subset of contacts and the second subset of contacts or a difference between the first organizational criteria and the second organizational criteria.

27. A method comprising:
causing a display of first group-based information incorporating an identified first subset of contacts and first subset of applications or other executable components, wherein the first subset of contacts and the first subset of applications or other executable components are identified in accordance with first organizational criteria, the first organizational criteria defined by a user of a telecommunication device, and wherein the first subset of applications or other executable components are configured to incorporate the first subset of contacts and to enable the user to communicate with the first subset of contacts via the telecommunication device in a context corresponding to the first organizational criteria; and
causing a display of a second group-based information incorporating an identified second subset of contacts and second subset of applications or other executable components, wherein the second subset of contacts and the second subset of applications or other executable components are identified in accordance with second organizational criteria, the second organizational criteria defined by the user of the telecommunication device, and wherein the second subset of applications or other executable components are configured to incorporate the second subset of contacts and to enable the user to communicate with the second subset of contacts via the telecommunication device in a context corresponding to the second organizational criteria; and
wherein the first and second group-based information have at least one application or other executable component in common and wherein the at least one application or other executable component is configured differently between the at least one application or other executable component's respective inclusion in the first group-based information and the at least one application or other executable component's respective inclusion in the second group-based information; and
wherein the method is implemented by at least one computing device.

28. The method as recited in claim 27, wherein individual contacts in the first and second subset of contacts are selected by the user of the communication device.

29. The method as recited in claim 27, wherein the organizational criteria include at least one of organization criteria, event-based criteria or topic based criteria.

30. The method as recited in claim 27, wherein causing display of a first group-based information incorporating the first identified subset of contacts and the first subset of applications or other executable components and causing display of a second group-based information incorporating the second identified subset of contacts and the second subset of applications or other executable components includes causing the display of the first and second group-based information without a desktop metaphor.

31. The method as recited in claim 27, wherein the first and second organizational criteria are the same.

32. The method as recited in claim 27 further comprising causing a transition between the display of the first group-based information and the display of the second group-based information.

33. The method as recited in claim 32, wherein the transition corresponds to emulating a circular path.

34. The method as recited in claim 27, wherein the at least one application or other executable component is configured differently between its respective inclusion in the first group-based information and its respective inclusion in the second group-based information in accordance with at least one of a difference between the first subset of contacts and the second subset of contacts or a difference between the first organizational criteria and the second organizational criteria.

* * * * *